US012787113B2

(12) United States Patent
Abotabl et al.

(10) Patent No.: US 12,787,113 B2
(45) Date of Patent: Nov. 3, 2026

(54) BEAM BASED CELL DISCONTINUOUS TRANSMISSION AND CELL DISCONTINUOUS RECEPTION

(71) Applicant: QUALCOMM Incorporated, San Diego, CA (US)

(72) Inventors: Ahmed Attia Abotabl, San Diego, CA (US); Diana Maamari, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 392 days.

(21) Appl. No.: 18/521,804

(22) Filed: Nov. 28, 2023

(65) Prior Publication Data

US 2025/0176063 A1 May 29, 2025

(51) Int. Cl.
*H04W 76/28* (2018.01)
*H04W 72/23* (2023.01)

(52) U.S. Cl.
CPC .......... *H04W 76/28* (2018.02); *H04W 72/23* (2023.01)

(58) Field of Classification Search
CPC .............................. H04W 76/28; H04W 72/23
See application file for complete search history.

(56) References Cited

U.S. PATENT DOCUMENTS

2025/0113366 A1* 4/2025 Cirik .................... H04W 76/20
2025/0141591 A1* 5/2025 Abotabl ............ H04W 52/0216

* cited by examiner

*Primary Examiner* — Farid Seyedvosoghi
(74) *Attorney, Agent, or Firm* — ARENTFOX SCHIFF, LLP

(57) ABSTRACT

This disclosure provides systems, methods and apparatus, including computer programs encoded on computer storage media for a base station and a user equipment (UE) to operate in a directional cell discontinuous transmission (DTX) mode or a directional cell discontinuous reception (DRX) mode. The UE receives a configuration of an active period and a non-active period for one or both of a cell DRX configuration or a cell DTX configuration. The UE receives a downlink control information indicating that the configuration is activated. The configuration is associated with an indication of direction. The UE determines whether to receive or transmit a communication during the non-active period of the configuration based on the communication being associated with the indication of direction.

30 Claims, 12 Drawing Sheets

BEAM BASED CELL DISCONTINUOUS TRANSMISSION AND CELL DISCONTINUOUS RECEPTION

TECHNICAL FIELD

The present disclosure relates to wireless communications including beam based cell discontinuous transmission and cell discontinuous reception.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (such as with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard.

SUMMARY

The systems, methods and devices of this disclosure each have several innovative aspects, no single one of which is solely responsible for the desirable attributes disclosed herein.

In some aspects, the techniques described herein relate to a method of wireless communication for a user equipment (UE), including: receiving a configuration of an active period and a non-active period for one or both of a cell discontinuous reception (DRX) configuration or a cell discontinuous transmission (DTX) configuration; receiving a downlink control information indicating that the configuration is activated, wherein the configuration is associated with an indication of direction; and determining whether to receive or transmit a communication during the non-active period of the configuration based on the communication being associated with the indication of direction.

The present disclosure also provides an apparatus (e.g., a UE) including a memory storing computer-executable instructions and at least one processor configured to execute the computer-executable instructions to perform at least one of the above methods, an apparatus including means for performing at least one of the above methods, and a non-transitory computer-readable medium storing computer-executable instructions for performing at least one of the above methods.

In some aspects, the techniques described herein relate to a method of wireless communication for a network node, including: transmitting, to a user equipment (UE), a configuration of an active period and a non-active period for one or both of a cell discontinuous reception (DRX) configuration or a cell discontinuous transmission (DTX) configuration; transmitting, to the UE, a downlink control information indicating that the configuration is activated, wherein the configuration is associated with an indication of direction; and determining whether to receive or transmit a communication with the UE during the non-active period of the configuration based on the communication being associated with the indication of direction.

The present disclosure also provides an apparatus (e.g., a network node) including a memory storing computer-executable instructions and at least one processor configured to execute the computer-executable instructions to perform at least one of the above methods, an apparatus including means for performing at least one of the above methods, and a non-transitory computer-readable medium storing computer-executable instructions for performing at least one of the above methods.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
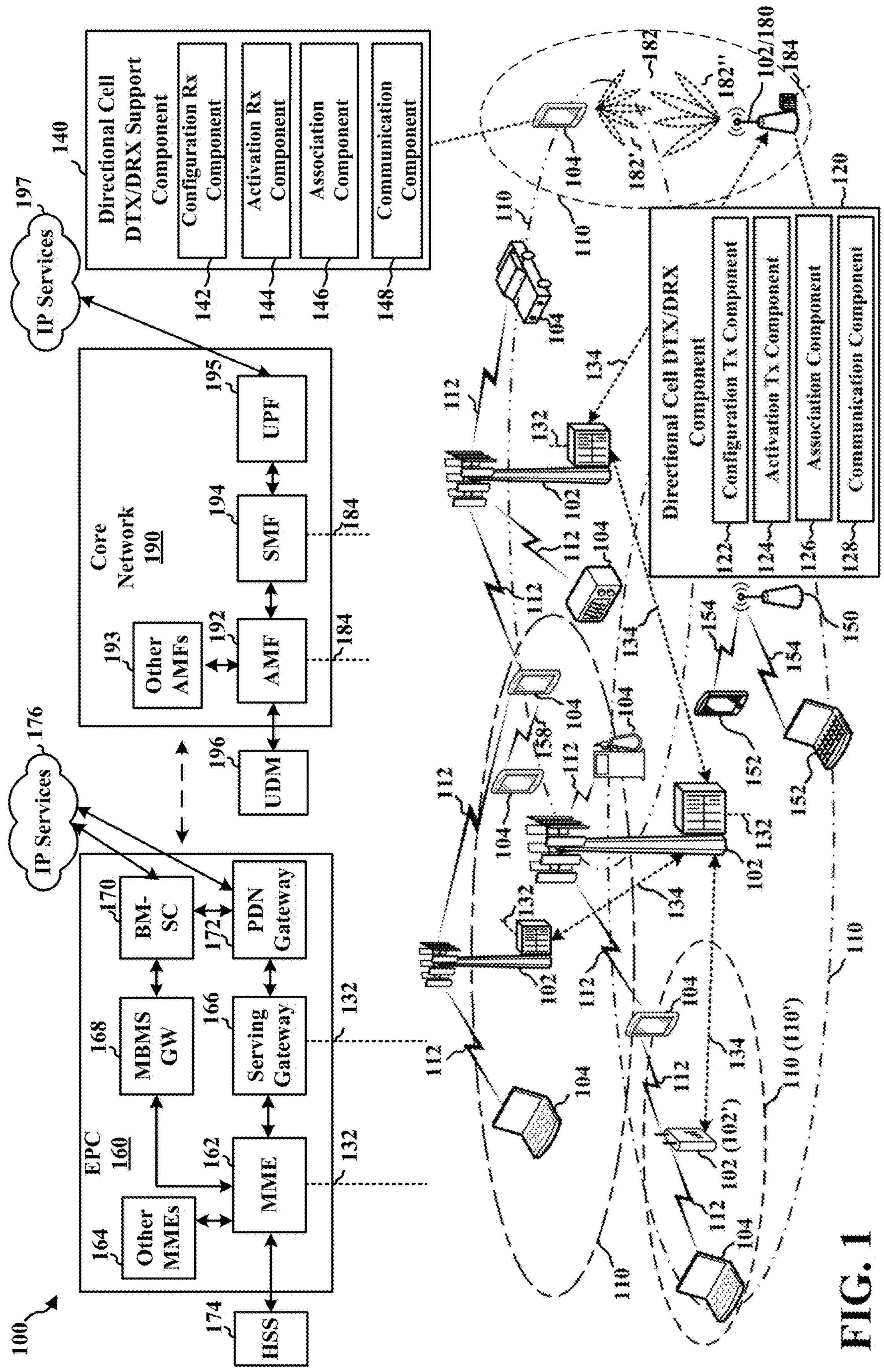
FIG. 1 is a diagram illustrating an example of a wireless communications system including an access network.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving RF signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IoT) network, such as a system utilizing 3G, 4G or 5G, or further implementations thereof, technology.

Wireless networks are known to consume significant amounts of power. Conventionally, efforts to reduce power consumption have focused on the user equipment (UE), which is typically battery powered and has a limited supply of energy. Power saving, however, may also be applicable to network nodes. Conventionally, such network nodes are continuously powered and consume energy. Although the energy may be continuously supplied by an electric grid, the energy consumption still has monetary and environmental costs. Accordingly, power saving for the network in addition to the UE may be beneficial.

Network energy saving may adapt techniques that are similar to power saving techniques used at the user equipment. For example, two proposed techniques are dynamic adaptation of the spatial and power domains and discontinuous transmission (DTX) and discontinuous reception (DRX) at the cell. In general, cell DTX/DRX may provide active periods in which the cell behaves normally and non-active periods in which some communications are limited.

Previously proposed cell DTX/DRX schemes operate on a per cell or per transmit-receive point (TRP) granularity. For example, the active period and the non-active period of a DTX/DRX configuration may be configured (e.g., at a radio resource control (RRC) level. A downlink control information (DCI) may indicate that a DTX/DRX configuration is activated for a group of UEs. Once the DTX/DRX configuration is activated, all UEs configured with the DTX/DRX configuration may assume that certain channels are not transmitted or received during the non-active period. Although the previously proposed DTX/DRX schemes can save power, greater flexibility may be desirable for real-world networks.

Different network loading in different directions is a common situation. For example, one serving direction may be toward a busy office building while another serving direction may be an empty area with few UEs. A network deployment may utilize multiple transmission panels, where each panel serves a sector of a coverage area of a network node (e.g., a gNB). In an aspect, for network energy saving purposes, a panel may enter a sleep mode or a cell DTX/DRX operation while another panel remains active, depending on the loading of each serving direction. Accordingly, operation of cell DTX/DRX procedures for different signal directions may further improve network energy savings.

In an aspect, a cell DTX/DRX configuration may be associated with an indication of direction. For example, the indication of direction may include a set of reference signals, a transmission configuration indication (TCI) state, and/or a spatial relation. During the non-active period of the DTX/DRX configuration, the UE and/or the network node may determine whether to receive or transmit a communication based on the communication being associated with the indication of direction. For example, a network node may associate a DTX/DRX configuration with an indication of direction (e.g., for a sector of a cell). During the non-active period, the network node may not transmit certain communications (e.g., persistent or semi-persistent scheduled communications) such as a channel state information-reference signal (CSI-RS) corresponding to the indication of direction. Similarly, on the uplink the UE may determine not to transmit a CSI report on a PUCCH or PUSCH corresponding to the indication of direction.

The techniques disclosed herein may be implemented to realize one or more of the following technical effects. A directional cell DTX/DRX configuration may provide greater granularity for selecting which communications are not transmitted or received, resulting in increased usage of cell DTX/DRX and associated power savings. The disclosed signaling mechanisms extend existing messages to provide the greater granularity without significant increases in signaling overhead.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. The processor may include an interface or be coupled to an interface that can obtain or output signals. The processor may obtain signals via the interface and output signals via the interface. In some implementations, the interface may be a printed circuit board (PCB) transmission line. In some other implementations, the interface may include a wireless transmitter, a wireless transceiver, or a combination thereof. For example, the interface may include a radio frequency (RF) transceiver which can be implemented to receive or transmit signals, or both. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (such as a 5G Core (5GC)). The base stations 102 may include macrocells (high power cellular base station) or small cells (low power cellular base station). The macrocells include base stations. The small cells include femtocells, picocells, and microcells. The small cells include femtocells, picocells, and microcells. The base stations 102 can be configured in a Disaggregated RAN (D-RAN) or Open RAN (O-RAN) architecture, where functionality is split between multiple units such as a central unit (CU), one or more distributed units (DUs), or a radio unit (RU). Such architectures may be configured to utilize a protocol stack that is logically split between one or more units (such as one or more CUs and one or more DUs). In some aspects, the CUS may be implemented within an edge RAN node, and in some aspects, one or more DUs may be co-located with a CU, or may be geographically distributed throughout one or multiple RAN nodes. The DUs may be implemented to communicate with one or more RUs.

In some implementations, one or more of the UEs 104 include a directional cell DTX/DRX support component 140 configured to follow a cell DTX/DRX configuration for directional communications. The directional cell DTX/DRX support component 140 includes a configuration receiving (Rx) component 142, an activation Rx component 144, an association component 146, and a communication component 148. The configuration Rx component 142 is configured to receive a configuration of an active period and a non-active period for one or both of a cell DRX configuration or a cell DTX configuration. The activation Rx component 144 is configured to receive a downlink control information indicating that the configuration is activated. The association component 146 is configured to determine that the configuration is associated with an indication of direction. The communication component 148 is configured to determine whether to receive or transmit a communication during the non-active period of the configuration based on the communication being associated with the indication of direction.

In some implementations, one or more of the base stations 102 include a directional cell DTX/DRX component 120 configured to operate according to a cell DTX/DRX configuration for directional communications. The directional cell DTX/DRX component 120 includes a configuration transmitting (Tx) component 122, an activation Tx component 124, an association component 126, and a communication component 128. The configuration Tx component 122 is configured to transmit, to a UE, a configuration of an active period and a non-active period for one or both of a cell discontinuous reception (DRX) configuration or a cell discontinuous transmission (DTX) configuration. The activation Tx component 124 is configured to transmit, to the UE, a downlink control information indicating that the configuration is activated. The association component 126 is configured to associate the configuration with an indication of direction. The communication component 128 is configured to determine whether to receive or transmit a communication with the UE during the non-active period of the configuration based on the communication being associated with the indication of direction.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (such as S1 interface), which may be wired or wireless. The base stations 102 configured for 5G NR (collectively referred to as Next Generation RAN (NG-RAN)) may interface with core network 190 through second backhaul links 184, which may be wired or wireless. In addition to other functions, the base stations 102 may perform one or more of the following functions: transfer of user data, radio channel ciphering and deciphering, integrity protection, header compression, mobility control functions (such as handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (such as through the EPC 160 or core network 190) with each other over third backhaul links 134 (such as X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network also may include Home Evolved Node Bs (eNBs) (HeNBs), which may provide service to a restricted group known as a closed subscriber group (CSG). The communication links 112 between the base stations 102 and the UEs 104 may include UL (also referred to as reverse link) transmissions from a UE 104 to a base station 102 or DL (also referred to as forward link) transmissions from a base station 102 to a UE 104. The communication links 112 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (such as 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (such as more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to or increase capacity of the access network.

A base station 102, whether a small cell 102' or a large cell (such as macro base station), may include an eNB, gNodeB (gNB), or other type of base station. Some base stations, such as gNB 180 may operate in one or more frequency bands within the electromagnetic spectrum.

The electromagnetic spectrum is often subdivided, based on frequency/wavelength, into various classes, bands, channels, etc. In 5G NR two initial operating bands have been identified as frequency range designations FR1 (410 MHz-7.125 GHZ) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, or other IP services.

The base station may include or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (such as a MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (such as a parking meter, gas pump, toaster, vehicles, heart monitor, etc.). The UE 104 also may be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies including future 6G technologies.

Figures 2A, 2B, 2C, 2D:
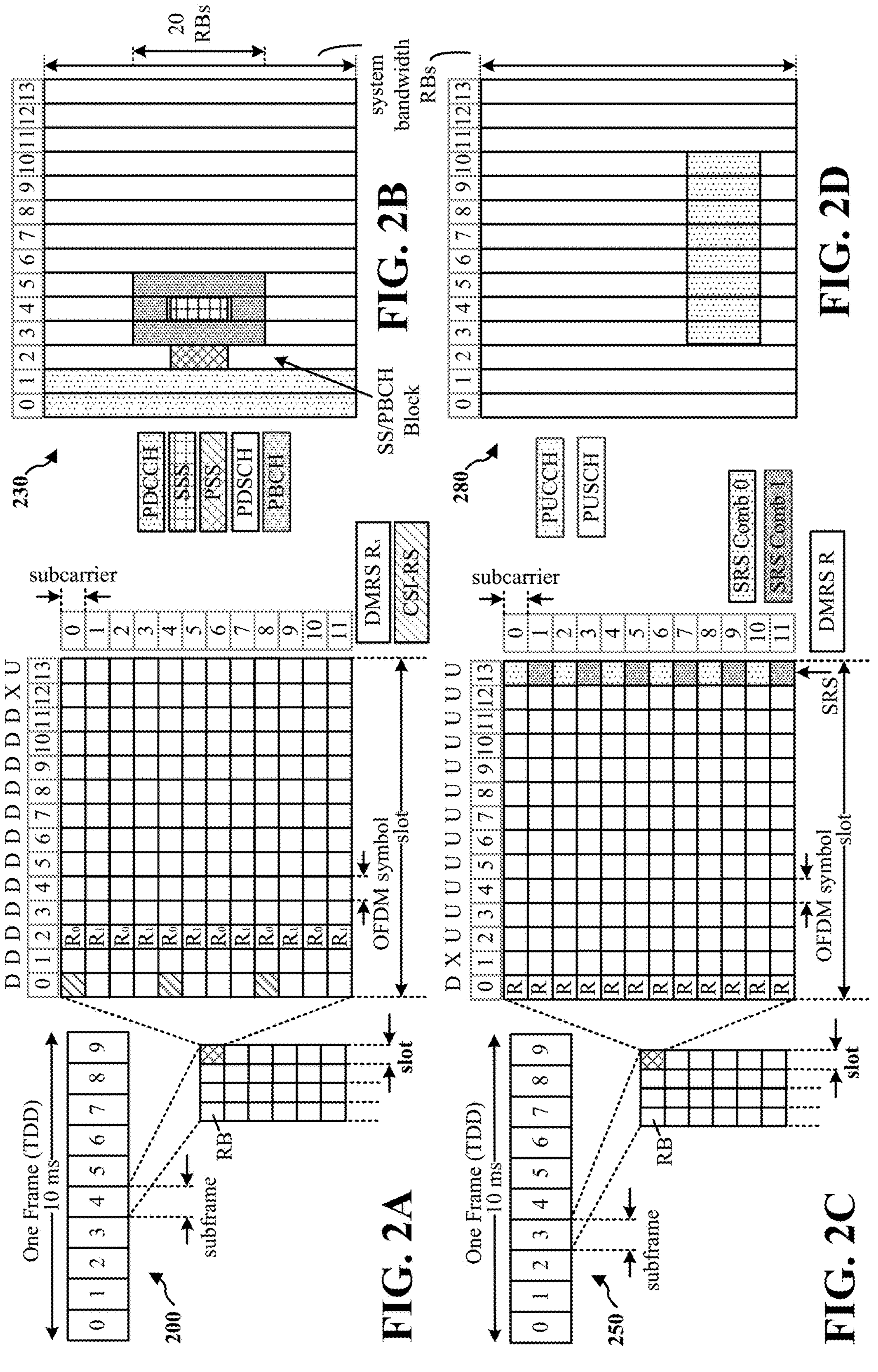
FIG. 2A is a diagram illustrating an example of a first frame.
FIG. 2B is a diagram illustrating an example of DL channels within a subframe.
FIG. 2C is a diagram illustrating an example of a second frame.
FIG. 2D is a diagram illustrating an example of a subframe.

FIG. 2A is a diagram 200 illustrating an example of a first frame. FIG. 2B is a diagram 230 illustrating an example of DL channels within a subframe. FIG. 2C is a diagram 250 illustrating an example of a second frame. FIG. 2D is a diagram 280 illustrating an example of a subframe. The 5G NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. A subset of the total cell bandwidth of a cell is referred to as a Bandwidth Part (BWP) and bandwidth adaptation is achieved by configuring the UE with BWP(s) and telling the UE which of the configured BWPs is currently the active one. In an aspect, a narrow bandwidth part (NBWP) refers to a BWP having a bandwidth less than or equal to a maximum configurable bandwidth of a BWP. The bandwidth of the NBWP is less than the carrier system bandwidth.

In the examples provided by FIGS. 2A, 2C, the 5G NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure or different channels. A frame (10 milliseconds (ms)) may be divided into 10 equally sized subframes (1 ms). Each subframe may include one or more time slots. Subframes also may include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^{\mu}$ slots/subframe. The subcarrier spacing and symbol length/duration are a function of the numerology. The subcarrier spacing may be equal to $2^{\mu}*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 microseconds (μs).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100× is the port number, but other DM-RS configurations are possible) and channel state information reference signals (CSI-RS) for channel estimation at the UE. The RS also may include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a L1 identity. A secondary synchronization signal (SSS) may be within symbol 4 of particular subframes of a frame. The SSS is used by a UE to determine a L1 cell identity group number and radio frame timing. Based on the L1 identity and the L1 cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (SSB). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), or UCI.

Figure 3:
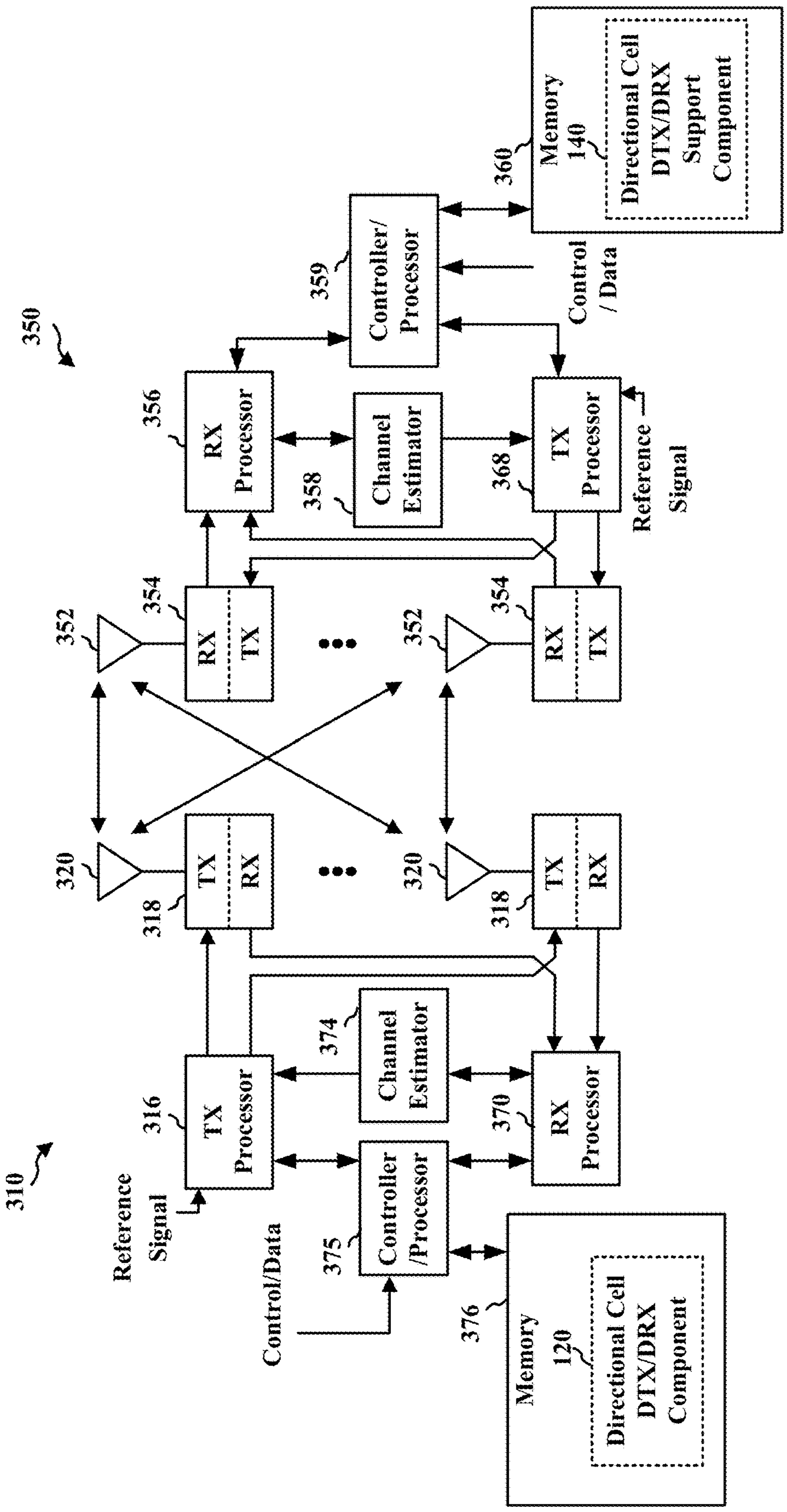
FIG. 3 is a diagram illustrating an example of a base station (BS) and user equipment (UE) in an access network.

FIG. 3 is a diagram of an example of a base station 310 and a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as MIB, SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may be split into parallel streams. Each stream may be mapped to an OFDM subcarrier, multiplexed with a reference signal (such as a pilot) in the time or frequency domain, and combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal or channel condition feedback transmitted by the UE 350. Each spatial stream may be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are decoded and deinterleaved to recover the data and control signals that were originally transmitted by the base station 310 on the physical channel. The data and control signals are provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 310, the controller/processor 359 provides RRC layer functionality associated with system information (such as MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK or NACK protocol to support HARQ operations.

At least one of the TX processor 368, the RX processor 356, and the controller/processor 359 may be configured to perform aspects in connection with the directional cell DTX/DRX support component 140 of FIG. 1. For example, the memory 360 may include executable instructions defining the directional cell DTX/DRX support component 140. The TX processor 368, the RX processor 356, and/or the controller/processor 359 may be configured to execute the directional cell DTX/DRX support component 140.

At least one of the TX processor 316, the RX processor 370, and the controller/processor 375 may be configured to perform aspects in connection with the directional cell DTX/DRX component 120 of FIG. 1. For example, the memory 376 may include executable instructions defining the directional cell DTX/DRX component 120. The TX processor 316, the RX processor 370, and/or the controller/processor 375 may be configured to execute the directional cell DTX/DRX component 120.

Figure 4:
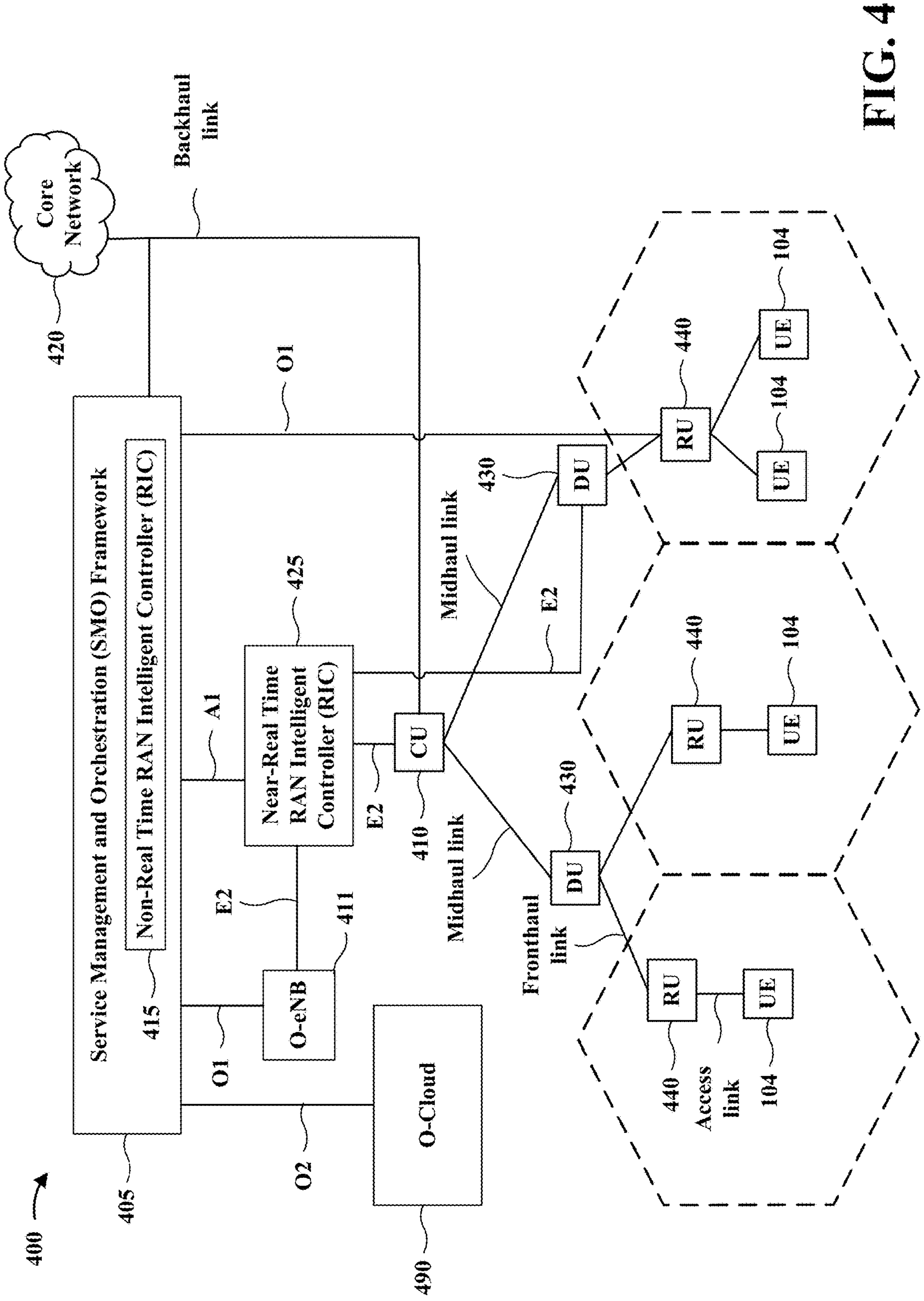
FIG. 4 is a diagram illustrating an example disaggregated base station architecture.

FIG. 4 is a diagram illustrating an example disaggregated base station 400 architecture. The disaggregated base station 400 architecture may include one or more central units (CUs) 410 that can communicate directly with a core network 420 via a backhaul link, or indirectly with the core network 420 through one or more disaggregated base station units (such as a Near-Real Time (Near-RT) RAN Intelligent Controller (RIC) 425 via an E2 link, or a Non-Real Time (Non-RT) RIC 415 associated with a Service Management and Orchestration (SMO) Framework 405, or both). A CU 410 may communicate with one or more distributed units (DUs) 430 via respective midhaul links, such as an F1 interface. The DUs 430 may communicate with one or more radio units (RUs) 440 via respective fronthaul links. The RUs 440 may communicate with respective UEs 104 via one or more radio frequency (RF) access links. In some implementations, the UE 104 may be simultaneously served by multiple RUs 440.

Each of the units, i.e., the CUS 410, the DUs 430, the RUs 440, as well as the Near-RT RICs 425, the Non-RT RICs 415 and the SMO Framework 405, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 410 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 410. The CU 410 may be configured to handle user plane functionality (i.e., Central Unit-User Plane (CU-UP)), control plane functionality (i.e., Central Unit-Control Plane (CU-CP)), or a combination thereof. In some implementations, the CU 410 can be logically split into one or more CU-UP units and one or more CU-CP units. The CU-UP unit can communicate bidirectionally with the CU-CP unit via an interface, such as the E1 interface when implemented in an O-RAN configuration. The CU 410 can be implemented to communicate with the DU 430, as necessary, for network control and signaling.

The DU 430 may correspond to a logical unit that includes one or more base station functions to control the operation of one or more RUs 440. In some aspects, the DU 430 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 430 may further host one or more low PHY layers. Each layer (or module) can be implemented with an interface configured to communicate signals with other layers (and modules) hosted by the DU 430, or with the control functions hosted by the CU 410.

Lower-layer functionality can be implemented by one or more RUs 440. In some deployments, an RU 440, controlled by a DU 430, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 440 can be implemented to handle over the air (OTA) communication with one or more UEs 104. In some implementations, real-time and non-real-time aspects of control and user plane communication with the RU(s) 440 can be controlled by the corresponding DU 430. In some scenarios, this configuration can enable the DU(s) 430 and the CU 410 to be implemented in a cloud-based RAN architecture, such as a vRAN architecture.

The SMO Framework 405 may be configured to support RAN deployment and provisioning of non-virtualized and virtualized network elements. For non-virtualized network elements, the SMO Framework 405 may be configured to support the deployment of dedicated physical resources for RAN coverage requirements which may be managed via an operations and maintenance interface (such as an O1 interface). For virtualized network elements, the SMO Framework 405 may be configured to interact with a cloud computing platform (such as an open cloud (O-Cloud) 490) to perform network element life cycle management (such as to instantiate virtualized network elements) via a cloud computing platform interface (such as an O2 interface). Such virtualized network elements can include, but are not limited to, CUs 410, DUs 430, RUs 440 and Near-RT RICs 425. In some implementations, the SMO Framework 405 can communicate with a hardware aspect of a 4G RAN, such as an open eNB (O-eNB) 411, via an O1 interface. Additionally, in some implementations, the SMO Framework 405 can communicate directly with one or more RUs 440 via an O1 interface. The SMO Framework 405 also may include a Non-RT RIC 415 configured to support functionality of the SMO Framework 405.

The Non-RT RIC 415 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 425. The Non-RT RIC 415 may be coupled to or communicate with (such as via an A1 interface) the Near-RT RIC 425. The Near-RT RIC 425 may be configured to include a logical function that enables near-real-time control and optimization of RAN elements and resources via data collection and actions over an interface (such as via an E2 interface) connecting one or more CUs 410, one or more DUs 430, or both, as well as an O-eNB, with the Near-RT RIC 425.

In some implementations, to generate AI/ML models to be deployed in the Near-RT RIC 425, the Non-RT RIC 415 may receive parameters or external enrichment information from external servers. Such information may be utilized by the Near-RT RIC 425 and may be received at the SMO Framework 405 or the Non-RT RIC 415 from non-network data sources or from network functions. In some examples, the Non-RT RIC 415 or the Near-RT RIC 425 may be configured to tune RAN behavior or performance. For example, the Non-RT RIC 415 may monitor long-term trends and patterns for performance and employ AI/ML models to perform corrective actions through the SMO Framework 405 (such as reconfiguration via O1) or via creation of RAN management policies (such as A1 policies).

Figure 5:
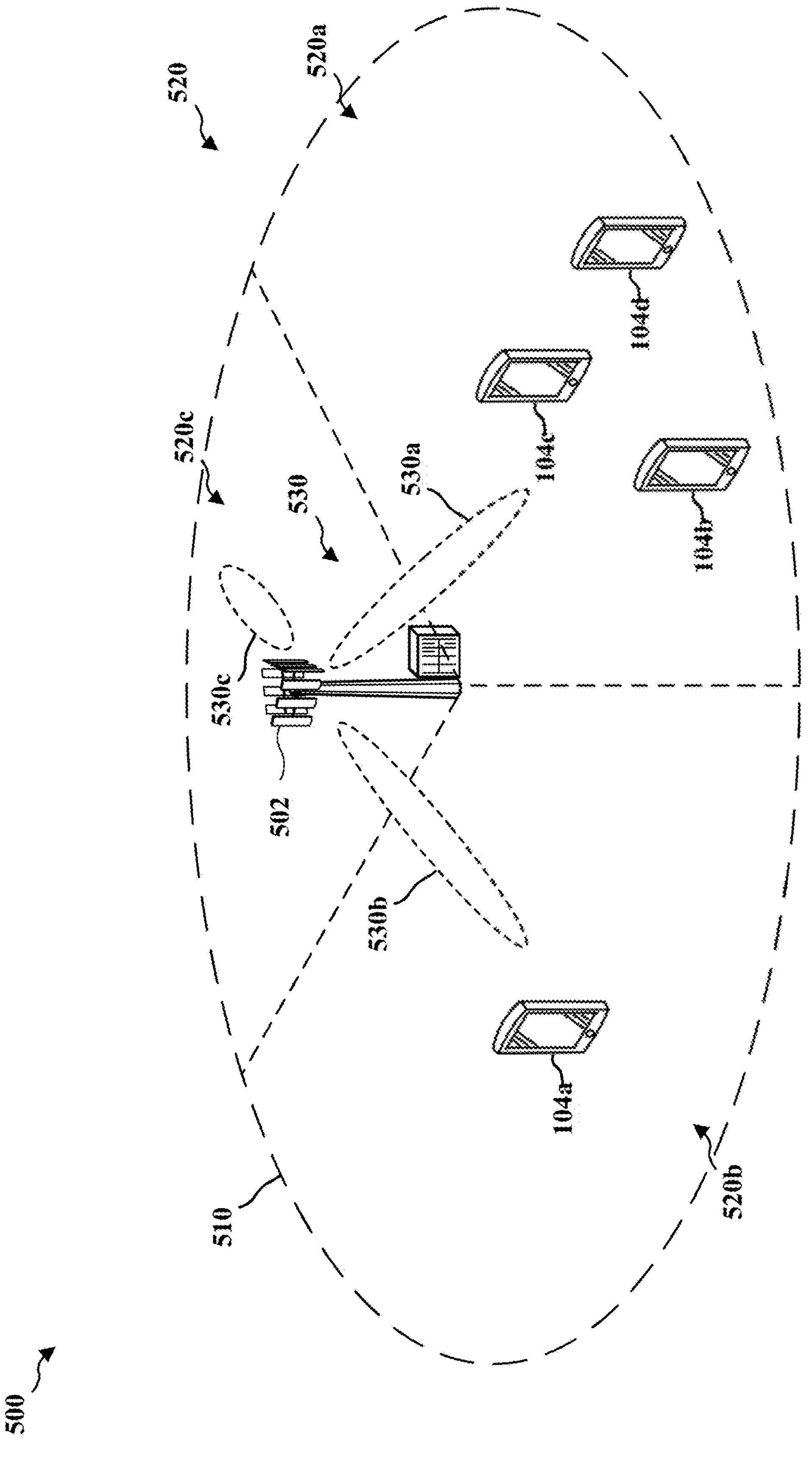
FIG. 5 is a diagram of an example of power savings in a scenario with uneven loading of sectors of a cell.

FIG. 5 is a diagram 500 of an example of power savings in a scenario with uneven loading of sectors of a cell. A network node 502 such as a base station or gNB provides a cell with a coverage area 510. The coverage area 510 is divided into multiple sectors 520 (e.g., sectors 520*a*, 520*b*, and 520*c*). Although three sectors are illustrated, different numbers of sectors are possible. In some implementations, each sector is associated with a different panel. The network node 502 may serve each sector with one or more beams 530 (e.g., beams 530*a*, 530*b*, and 530*c*). Each beam 530 may be associated with a direction.

A direction of a beam may be indicated in various manners. Generally, an indication of direction is based on a reference signal that is quasi-co-located (QCL) with the beam, or source thereof. In some implementations, an indication of direction may indicate a set of reference signals. For example, multiple narrow beams may overlap with a wider beam, and the reference signals corresponding to each of the beams may be included in a set of reference signals. Any reference signal in the set may indicate a direction. In some implementations, a TCI state is used to indicate a downlink beam to the UE. A configuration of a TCI state may include one or more reference signals such as a synchronization signal block (SSB) or CSI-RS. Accordingly, a set of one or more TCI states may be used to indicate a direction. A spatial relation is typically used to indicate an uplink beam to the UE. A configuration of a spatial relation may include one or more reference signals. For instance, a reference signal for a spatial relation may include a sounding reference signal (SRS) transmitted by the UE, or a downlink reference signal such as a SSB or CSI-RS. Accordingly, a set of one or more spatial relations may indicate a direction. Further, the directions indicated by a reference signal, TCI state, and/or spatial relation may be interchangeable, for example, by determining a set associated with a reference signal.

In an example scenario for power saving with uneven loading of sectors of a cell, the sectors 520 may have an uneven distribution of UEs. For example, as illustrated, the sector 520*a* has three UEs, the sector 520*b* has one UE, and the sector 520*c* has no UEs. When a cell DTX/DRX configuration is only at the cell or TRP level, the network node 502 may determine the cell DTX/DRX configuration based on all of the UEs 104. Accordingly, the network node 502 may not be able to activate a cell DTX/DRX configuration if there is one or more active UEs in the cell. The network node 502 may also need to configure a cell DTX/DRX configuration with a longer active period, shorter non-active period, or greater duty cycle to accommodate some UEs. In contrast, with directional cell DTX/DRX, the network node 502 may apply different DTX/DRX configurations for different directions. For example, because the sector 520*c* has no UEs, a cell DTX/DRX configuration associated with the direction of the beam 530*c* may have a relatively long non-active period. For instance, the network node 502 may be able to power down a panel associated with the beam 530*c* during the non-active period. As another example, the network node 502 may associate the direction of the beam 530*b* for the sector 520*b* with a different cell DTX/DRX configuration based on the needs of UE 104*a*. In some implementations, if a sector 520*a* is busy due to a large number of UEs, the network node 502 may not activate a cell DTX/DRX configuration associated with the direction of the beam 530*a*.

Figure 6:
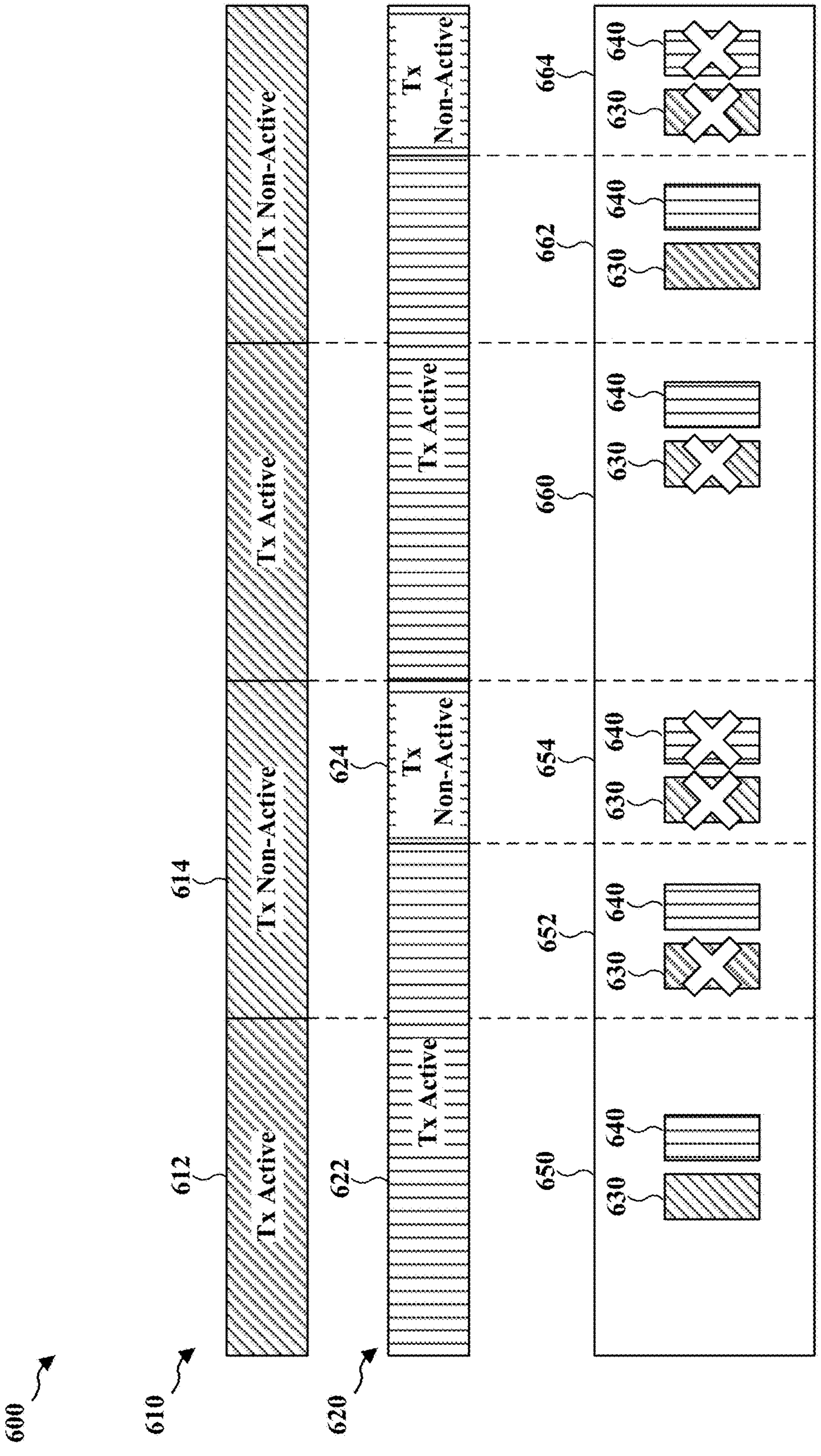
FIG. 6 is a timing diagram illustrating determining whether to transmit or receive a communication based on a cell discontinuous transmission/reception (DTX/DRX) configuration associated with a direction.

FIG. 6 is a timing diagram 600 illustrating determining whether to transmit or receive a communication based on a cell DTX/DRX configuration associated with a direction. A first cell DTX configuration 610 includes an active period 612 and a non-active period 614. For example, the first cell DTX configuration 610 may be associated with the sector 520*c* and the direction of the beam 530*c*. A second cell DTX configuration 620 includes an active period 622 and a non-active period 624. For example, the second cell DTX configuration 620 may be associated with the sector 520*b* and the direction of the beam 530*b*.

The network node 502 may be scheduled with periodic or semi-persistent scheduled (SPS) transmissions to which the DTX configurations 610, 620 are applicable. Generally, cell DTX/DRX configurations are not applicable to dynamically scheduled communications, for example, because the network node 502 would not dynamically schedule a communication during a time the network node 502 does not intend to transmit or receive. Examples of communications that may be subject to a cell DTX configuration include: periodic or semi-persistent CSI-RS, PDCCH in user specific search spaces, PDCCH in some common search spaces, a positioning reference signal (PRS), a CSI-RS configured by a measurement object, a CSI-RS associated with radio link monitoring or beam failure detection, a periodic CSI-RS associated with a tracking reference signal (TRS), or a CSI-RS for beam management. Similarly, a cell DRX configuration may be applicable to periodic or SPS communications (e.g., a configured grant). Example uplink communications subject to a cell DRX configuration may include: a periodic or semi-persistent CSI report, a periodic or semi-persistent SRS, and HARQ feedback for SPS PDSCH. In some implementations, the types of communications that are subject to a cell DTX/DRX configuration may be defined in a regulation, standards document, or in the configuration of the DTX/DRX configuration.

In the illustrated example, a first SPS communication 630 may be associated with the direction of the first cell DTX configuration 610, and a second SPS communication 640 may be associated with the direction of the second cell DTX configuration 620. For example, the first SPS communication 630 may be a CSI-RS that is included within a set of reference signals (e.g., within a beam of an SSB). The second SPS communication 640 may be, for example, a CSI-RS associated with a different beam. During a first time period 650, the first cell DTX configuration 610 is in the active period 612 and the second cell DTX configuration 620 is in the active period. The network node 502 transmits both the first SPS communication 630 and the second SPS communication 640 during the first time period 650. During a second time period 652, the first cell DTX configuration 610 is in the non-active period 614 and the second cell DTX configuration 620 is in the active period 622. The network node 502 transmits the second SPS communication 640 but refrains from transmitting the first SPS communication 630 during the second time period 652. In a third time period 654, the first cell DTX configuration 610 is in the non-active period 614 and the second cell DTX configuration 620 is in the non-active period 624. The network node 502 refrains from transmitting either of the second cell DTX configuration first SPS communication 630 and the second SPS communication 640 during the third time period 654. The first cell DTX configuration 610 and the second cell DTX configuration 620 follow a repeated pattern. Accordingly, the pattern of communications 630 and 640 repeats in time periods 660, 662, and 664.

Figure 7:
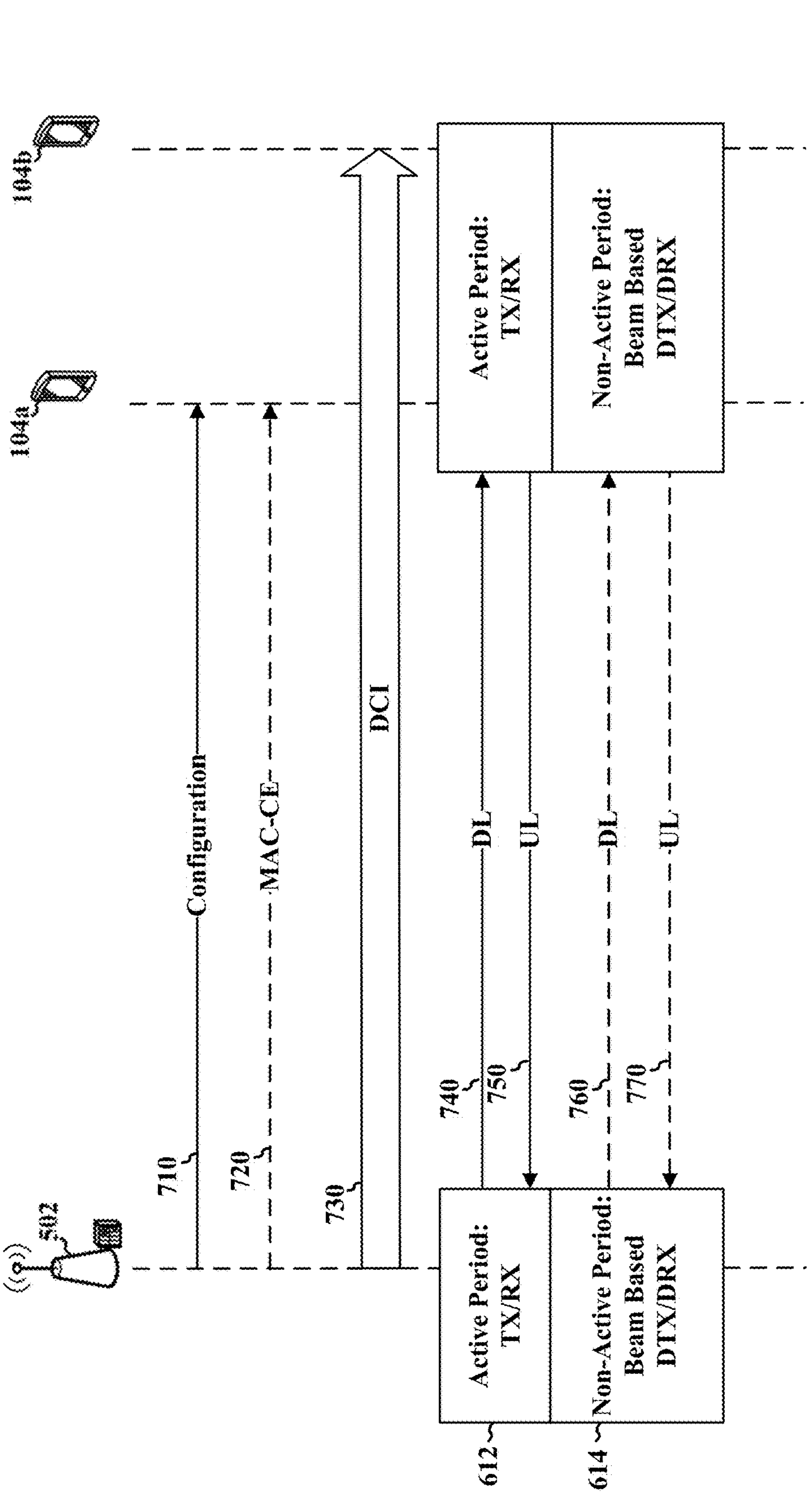
FIG. 7 is a message diagram illustrating various messages for implementing a directional cell DTX/DRX configuration.

FIG. 7 is a message diagram 700 illustrating various messages for implementing a directional cell DTX/DRX configuration. For example, the network node 502 may configure and activate the directional cell DTX/DRX configuration for one or more UEs 104. In some implementations, multiple cell DTX/DRX configurations may be configured and activated. The network node 502 and the UEs 104 may determine which communications are transmitted or received based on the cell DTX/DRX configurations and the direction of each communication.

The network node 502 transmits a configuration 710 of one or more cell DTX/DRX configurations. For example, the configuration 710 may be a RRC configuration message that includes an information element for each DTX/DRX configuration. Each DTX/DRX configuration 610 may define an active period 612 and a non-active period 614. In some implementations, the configuration 710 may define an associated indication of direction. For example, the configuration 710 may include an index of a set of reference signals, TCI states, and/or spatial relations associated with the DTX/DRX configuration 610.

In some implementations, the network node 502 may transmit a MAC-CE 720 that indicates whether an activated TCI state is associated with a cell DTX/DRX configuration. For example, multiple TCI states may be configured, and the MAC-CE 720 may indicate a set of active TCI states that may be indicated for a scheduled transmission. Due to the dynamic activation of different TCI states, a TCI state may not be associated with a DTX/DRX configuration.

The network node 502 transmits a downlink control information (DCI) 730 that activates one or more cell DTX/DRX configurations. For example, the DCI 730 may be a special DCI format that indicates which cell DTX/DRX configurations are activated. A UE 104 may monitor a search space for a group DCI 730 when the UE 104 is configured with at least one cell DTX/DRX configuration. In some implementations, the DCI 730 may also include an indication of direction associated with an activated cell DTX/DRX configuration. That is, the cell DTX/DRX configuration may be associated with the indication of direction upon activation. The DCI 730 may start a cycle of the active period 612 and non-active period 614. For example, the active period 612 may start in the slot following the DCI 730.

During the active period 612, the network node 502 transmits DL communications 740 and receives UL communications 750. Conversely, during the active period, the UEs 104 receive the DL communications 740 and transmit the UL communications 750. The network node 502 and the UEs 104 do not determine whether to transmit or receive based on the indication of direction during the active period 612.

During the non-active period, the network node 502 determines whether to transmit each DL communication 760 based at least in part on whether the communication is associated with the indication of direction for the activated cell DTX configuration. Similarly, the UEs 104 determine whether to receive each DL communication 760 based at least in part on whether the communication is associated with the indication of direction for the activated cell DTX configuration. In some implementations, the cell DTX configuration may apply to only some types of transmission. Accordingly, the network node 502 and the UE 104 may also consider wither the cell DTX configuration applies to the type of transmission of the DL communication 760.

During the non-active period, the UE 104 determines whether to transmit each UL communication 770 based at least in part on whether the communication is associated with the indication of direction for the activated cell DRX configuration. Similarly, the network node 502 determines whether to receive each UL communication 770 based at least in part on whether the communication is associated with the indication of direction for the activated cell DRX configuration. In some implementations, the cell DRX configuration may apply to only some types of transmission. Accordingly, the UE 104 and the network node 502 may also consider wither the cell DRX configuration applies to the type of transmission of the DL communication 760.

Figure 8:
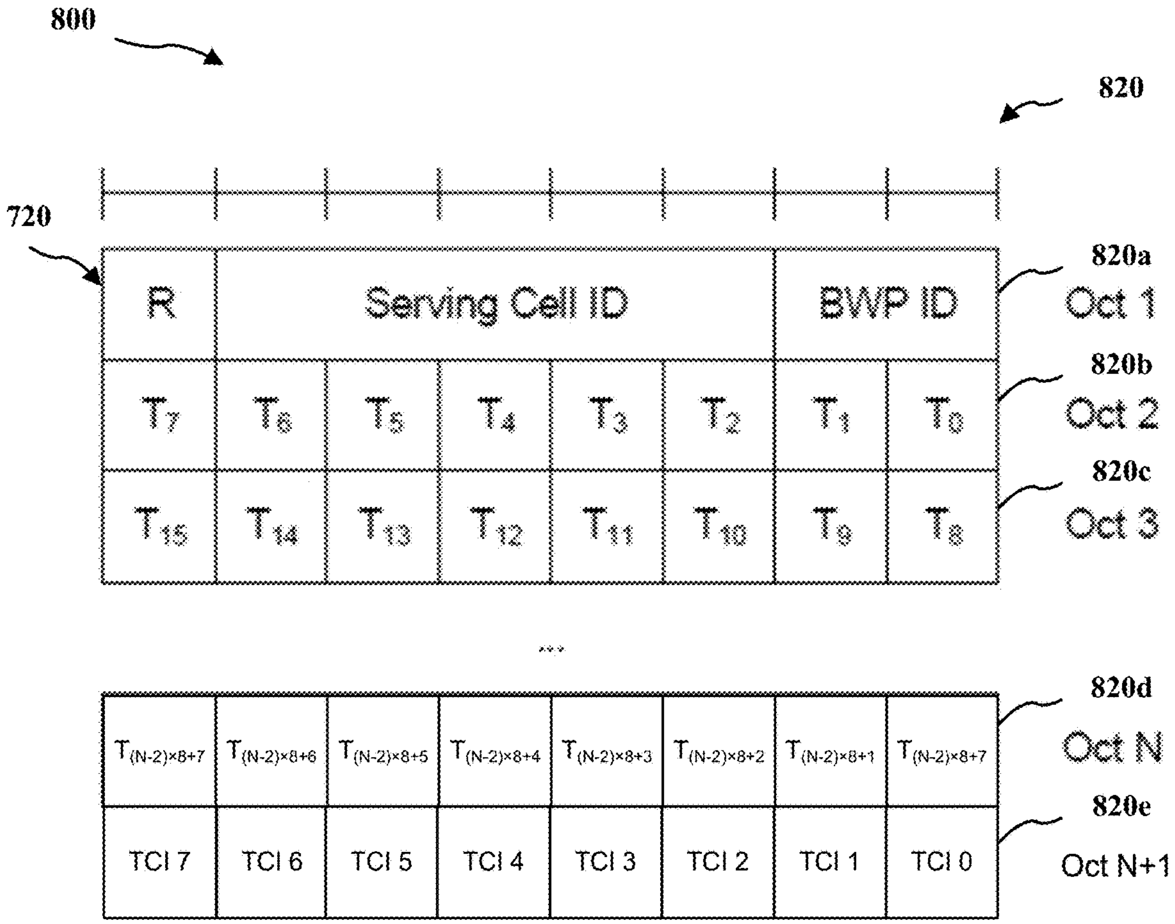
FIG. 8 is a diagram of an example MAC-CE for associating a transmission configuration indication (TCI) state with a cell DTX/DRX configuration.

FIG. 8 is a diagram 800 of an example MAC-CE 720 for associating a TCI state with cell DTX/DRX configuration. A 5G network may provide a mechanism for dynamic selection of TCI state. For example, the network node 502 may configure multiple TCI states using RRC messages. The number of configured TCI states may exceed the dynamic signaling capability of a DCI. The network node 502 may transmit MAC-CE that downselects the configured TCI states to a set of activated TCI states (e.g., 8 TCI states) that may be dynamically signaled in a DCI. In an aspect, the dynamic selection of TCI states may result in ambiguity as to whether a TCI state is associated with a cell DRX/DTX configuration.

The MAC-CE 720 includes an indication of whether an activated TCI state is associated with a cell DTX/DRX configuration. The MAC-CE 720 may be an example of the MAC-CE 720. The MAC-CE 720 may be an enhanced MAC-CE for TCI activation/deactivation. The MAC-CE 720 includes a plurality of octets 820. A first octet 820*a* includes identifiers for a serving cell and bandwidth part. The MAC-CE 720 includes a number of octets (e.g., octets 820*b*-820*d*) that define a bitmap indicating whether each configured TCI state is active. For instance, the number of indicated active TCI states may be limited by the number of codepoints in the DCI (e.g., 8). The MAC-CE 720 includes one or more additional octets 820*e* that indicate a subset of the activated TCI states that are associated with a DTX/DRX configuration. For example, the bits of the additional octet 820*e* may correspond to the order of the indices of the activated TCI states to indicate whether the corresponding activated TCI state is associated with the DTX/DRX configuration.

In an aspect, the MAC-CE 720 allows dynamic changes to the DTX/DRX configuration to match the dynamic selection of TCI states. For instance, the configuration 710 may indicate an initial set of TCI states. The network node 502 may update the set of TCI states that are applicable to the DTX/DRX configuration when activating different TCI states. For instance, if the network node 502 activates a TCI state for the beam 530*a*, which is not associated with the DTX/DRX configuration, the network node 502 may indicate no association in the corresponding bit of the additional octet 820*e*, whereas a bit corresponding to the beam 530*b*, which is associated with the DTX/DRX configuration, may indicate the association.

In some implementations, a subset of activated TCI states that are associated with the DTX/DRX configuration may be implicitly indicated by the MAC-CE 720 without the additional octet 820*e*. For instance, a size of the subset may be configured or defined in a standard or regulation. The configured number of TCI states corresponding to the size indicated as activated and having lowest identifiers in the MAC-CE may be associated with the cell DTX/DRX configuration.

Figure 9:
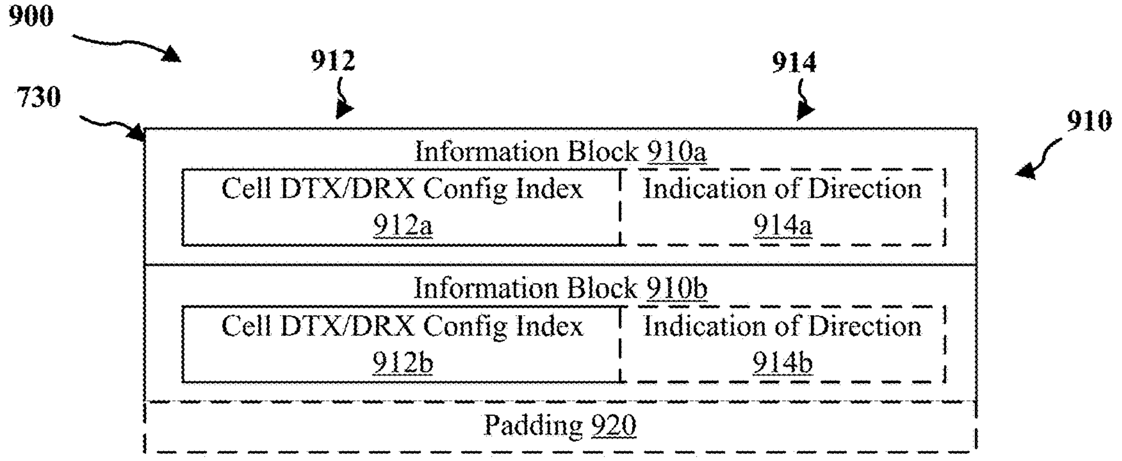
FIG. 9 is a diagram of an example downlink control information (DCI) for activation/deactivation of cell DTX/DRX configurations.

FIG. 9 is a diagram 900 of an example DCI 730 for activation/deactivation of cell DTX/DRX configurations. The DCI 730 may be a group common DCI for multiple UEs. The DCI 730 includes one or more information blocks 910 (e.g., information blocks 910*a* and 910*b*). Each information block 910 includes a cell DTX/DRX configuration index 912 (e.g., index 912*a* and 912*b*) that indicates which configuration to activate or deactivate. In some implementations, the DCI 730 includes an indication of direction 914 (e.g., indication of direction 914*a* and 914*b*) for the activated cell DTX/DRX configuration. For example, the indication of direction 914 may be a set of one or more TCI states, an index of a reference signal or a SSB, or a spatial relation information. For instance, the DCI 730 may include the indication of direction 914 when the cell DTX/DRX configuration index 912 indicates a configuration that is not yet associated with a direction. In some implementations, the DCI 730 includes padding 920 such that the size of the DCI 730 matches a configured size for a DCI format.

Figure 10:
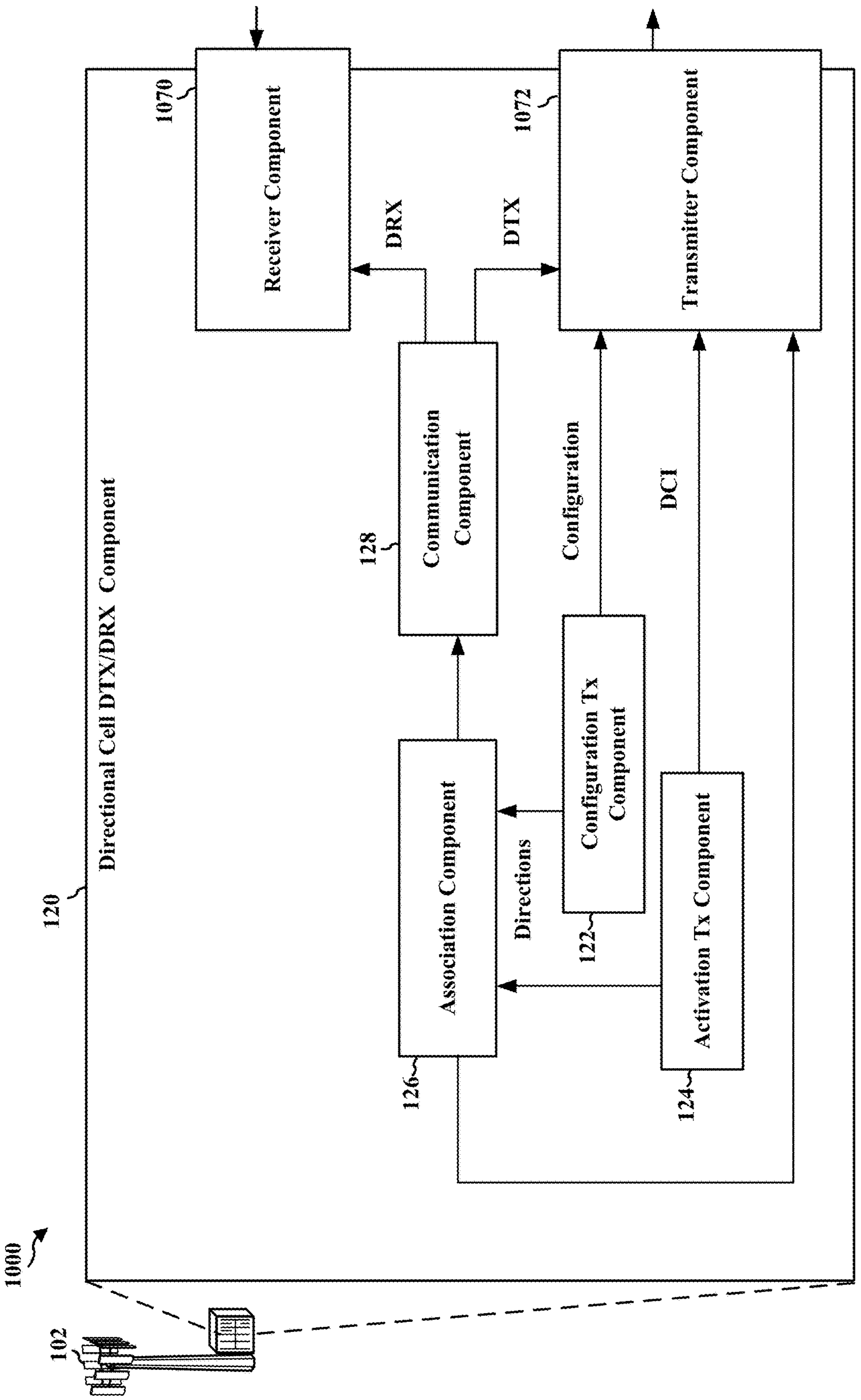
FIG. 10 is a conceptual data flow diagram illustrating the data flow between different means/components in an example base station.

FIG. 10 is a conceptual data flow diagram 1000 illustrating the data flow between different means/components in an example base station 102, which may be an example of the base station 102 (FIG. 1) including the directional cell DTX/DRX component 120. The directional cell DTX/DRX component 120 may be implemented by the memory 376 and the TX processor 316, the RX processor 370, and/or the controller/processor 375 of FIG. 3. For example, the memory 376 may store executable instructions defining the directional cell DTX/DRX component 120 and the TX processor 316, the RX processor 370, and/or the controller/processor 375 may execute the instructions.

The base station 102 may include a receiver component 1070, which may include, for example, a radio frequency (RF) receiver for receiving the signals described herein. The base station 102 may include a transmitter component 1072, which may include, for example, an RF transmitter for transmitting the signals described herein. In an aspect, the receiver component 1070 and the transmitter component 1072 may be co-located in a transceiver such as illustrated by the TX/RX 318 in FIG. 3.

As discussed with respect to FIG. 1, the directional cell DTX/DRX component 120 includes the configuration Tx component 122, the activation Tx component 124, the association component 126, and the communication component 128.

The receiver component 1070 may receive UL signals from the UE 104 such as the UL communications 750, 770. The receiver component 1070 may output the UL communications 750, 770 to a decoder.

The configuration Tx component 122 is configured to transmit, to a UE 104, a configuration 710 of an active period 612 and a non-active period 614 for one or both of a cell DRX configuration or a cell DTX configuration. For example, the configuration Tx component 122 may determine the active period 612 and the non-active period 614 based on predicted traffic loads. The configuration 710 may be, for example, a RRC configuration message including the active period 612 and the non-active period 614. In some implementations, the configuration Tx component 122 may determine a direction associated with the cell DTX/DRX configuration. The configuration Tx component 122 may include an indication of direction in the configuration 710. The configuration Tx component 122 may output the configuration 710 for transmission via the transmitter component 1072. The configuration Tx component 122 may output the associated direction to the association component 126.

The activation Tx component 124 is configured to transmit, to the UE 104, a DCI 730 indicating that the configuration is activated. For example, the activation Tx component 124 may determine to activate a cell DTX/DRX configuration based on a current load for a sector 520. The activation Tx component 124 may include an information block 910 for the DTX/DRX configuration in the DCI 730. In some implementations, the activation Tx component 124 may include an indication of direction 914 in the DCI 730 to associate the DTX/DRX configuration with a direction. The activation Tx component 124 may output the DCI 730 to the transmitter component 1072 for transmission to one or more UEs 104 (e.g., as a group common DCI).

The association component 126 is configured to associate the cell DTX/DRX configuration with an indication of direction. For example, either the configuration Tx component 122 or the activation Tx component 124 may output an indication of direction. The association component 126 may associate the indication of direction with the cell DTX/DRX configuration. For instance, the association component 126 may add the indication of direction to a set of directions associated with the cell DTX/DRX configuration. In some implementations, the association component 126 may convert different types of indications to a common type. For instance, the association component 126 may convert a TCI state or spatial relation to a corresponding reference signal. The association component 126 may output directions association with an activated cell DTX/DRX configuration to the communication component 128. In some implementations, the association component 126 may output a MAC-CE 720 for transmission to a UE 104. The MAC-CE 720 indicates whether an activated TCI state is associated with a cell DTX/DRX configuration.

The communication component 128 is configured to determine whether to receive or transmit a communication with the UE during the non-active period of the configuration based on the communication being associated with the indication of direction. For instance, the communication component 128 may receive an indication of a scheduled communication (e.g., DL communication 760 or UL communication 770) from a scheduler. During the non-active period 614, the communication component 128 may determine whether a direction of the communication corresponds to a direction associated with the active cell DTX/DRX configuration. The communication component 128 may further determine whether the active cell DTX/DRX configuration applies to a type of the communication. If the active cell DTX/DRX configuration applies to the type of the communication and is associated with the direction of the communication, the communication component 128 may output a DTX signal to the transmitter component 1072 or a DRX signal to the receiver component 1070. The DTX signal may indicate that the transmitter component 1072 should not transmit the scheduled communication. The DRX signal may indicate that the receiver component 1070 should not receive the scheduled transmission. In some implementations, the DTX signal or DRX signal may power down a component of the transmitter component 1072 or the receiver component 1070 when a communication is not to be transmitted/received.

Figure 11:
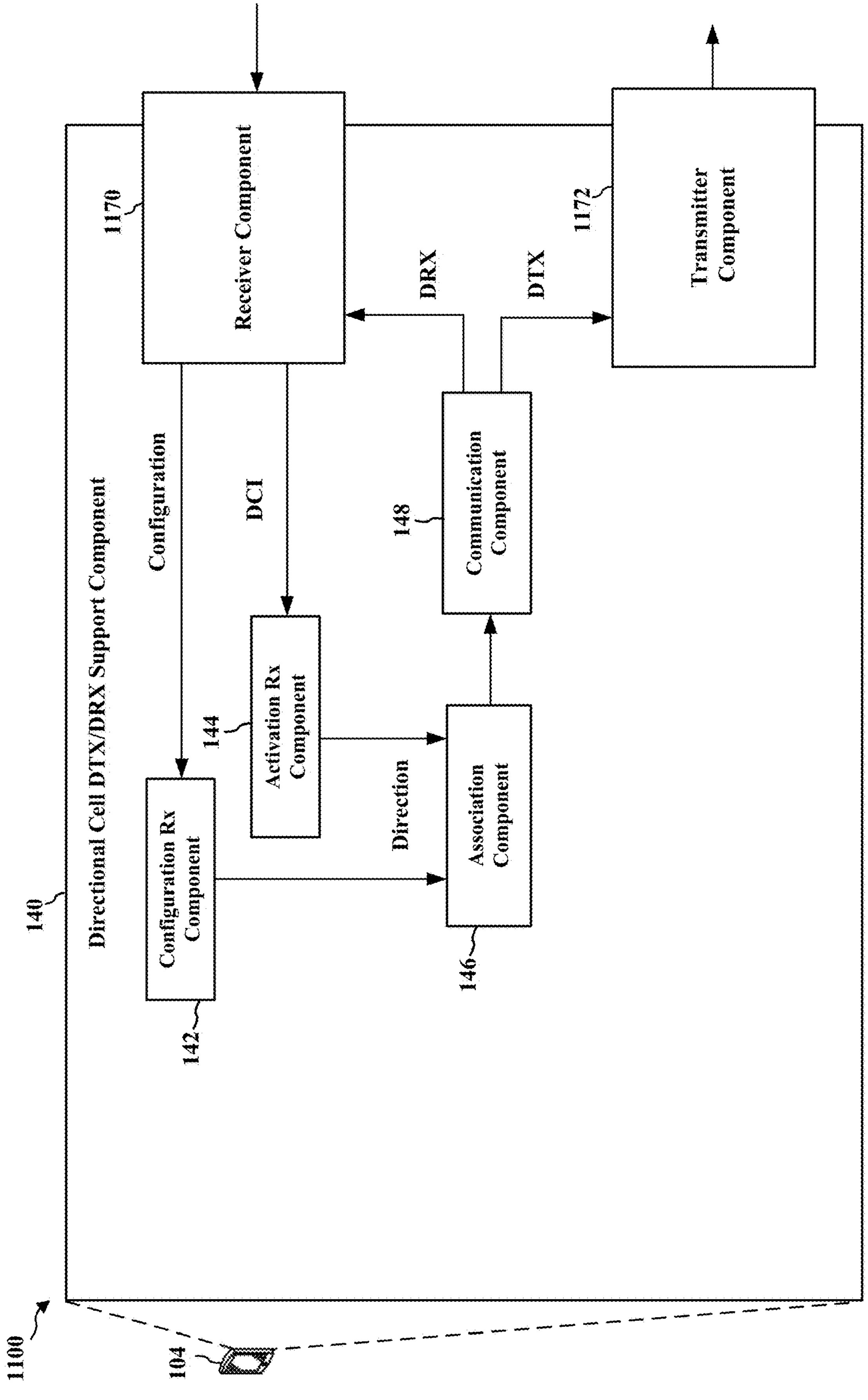
FIG. 11 is a conceptual data flow diagram illustrating the data flow between different means/components in an example UE.

FIG. 11 is a conceptual data flow diagram 1100 illustrating the data flow between different means/components in an example UE 104, which may be an example of the UE 104 (FIG. 1) and include the directional cell DTX/DRX support component 140. The directional cell DTX/DRX support component 140 may be implemented by the memory 360 and the TX processor 368, the RX processor 356, and/or the controller/processor 359. For example, the memory 360 may store executable instructions defining the directional cell DTX/DRX support component 140 and the TX processor 368, the RX processor 356, and/or the controller/processor 359 may execute the instructions.

The UE 104 may include a receiver component 1170, which may include, for example, a RF receiver for receiving the signals described herein. The UE 104 may include a transmitter component 1172, which may include, for example, an RF transmitter for transmitting the signals described herein. In an aspect, the receiver component 1170 and the transmitter component 1172 may co-located in a transceiver such as the TX/RX 352 in FIG. 3.

As discussed with respect to FIG. 1, the directional cell DTX/DRX support component 140 includes the configuration Rx component 142, the activation Rx component 144, the association component 146, and the communication component 148.

The receiver component 1170 may receive DL signals described herein such as the configuration 710, MAC-CE 720, DCI 730, and DL communications 740, 760. The receiver component 1170 may output the configuration 710 to the configuration Rx component 142. The receiver component 1170 may output the MAC-CE 720 to association component 146. The receiver component 1170 may output the DCI 730 to the activation Rx component 144. The receiver component 1170 may output the DL communications 740, 760 to a decoder.

The configuration Rx component 142 is configured to receive a configuration of an active period and a non-active period for one or both of a cell DRX configuration or a cell DTX configuration. For example, the configuration Rx component 142 may receive the configuration 710 via the receiver component 1170. The configuration Rx component 142 may decode the configuration 710 to determine information elements that define the active period 612 and the non-active period 614. In some implementations, the configuration 710 may include an indication of direction. The configuration Rx component 142 may output the indication of direction to the association component 146. The configuration Rx component 142 may output the active period 612 and the non-active period 614 to the communication component 148.

The activation Rx component 144 is configured receive a DCI 730 indicating that the configuration is activated. For example, the activation Rx component 144 may receive the DCI 730 via the receiver component 1170. In some implementations, the DCI 730 has a specified DCI format (e.g., format 2_9) that defines fields for the content of the DCI 730. The DCI 730 may be a group-common DCI transmitted on a group-common search space. The activation Rx component 144 and/or receiver component 1170 may perform blind decoding on the group-common search space to detect the DCI 730. The activation Rx component 144 may output an indication of the activated configuration to the communication component 148. In some implementations, where the DCI 730 includes the indication of direction 914, the activation Rx component 144 may output the direction to the association component 146.

The association component 146 is configured to associate the cell DTX/DRX configuration with an indication of direction. For example, either the configuration Rx component 142 or the activation Rx component 144 may output an indication of direction. The association component 146 may associate the indication of direction with the cell DTX/DRX configuration. For instance, the association component 146 may add the indication of direction to a set of directions associated with the cell DTX/DRX configuration. In some implementations, the association component 146 may convert different types of indications to a common type. For instance, the association component 146 may convert a TCI state or spatial relation to a corresponding reference signal. The association component 126 may output directions association with an activated cell DTX/DRX configuration to the communication component 148. In some implementations, the association component 146 may receive a MAC-CE 720 via the receiver component 1170. The MAC-CE 720 indicates whether an activated TCI state is associated with a cell DTX/DRX configuration.

The communication component 148 is configured to determine whether to receive or transmit a communication (e.g., DL communications 740, 760 or UL communications 750, 770) during the non-active period 614 of the configuration based on the communication being associated with the indication of direction. For instance, the communication component 148 may receive an indication of a scheduled communication (e.g., DL communication 760 or UL communication 770) from a scheduler. During the non-active period 614, the communication component 148 may determine whether a direction of the communication corresponds to a direction associated with the active cell DTX/DRX configuration. The communication component 148 may further determine whether the active cell DTX/DRX configuration applies to a type of the communication. If the active cell DTX/DRX configuration applies to the type of the communication and is associated with the direction of the communication, the communication component 148 may output a DTX signal to the transmitter component 1172 or a DRX signal to the receiver component 1170. The DTX signal may indicate that the transmitter component 1172 should not transmit the scheduled communication. The DRX signal may indicate that the receiver component 1170 should not receive the scheduled communication. In some implementations, the DTX signal or DRX signal may power down a component of the transmitter component 1172 or the receiver component 1170 when a communication is not to be transmitted/received.

Figure 12:
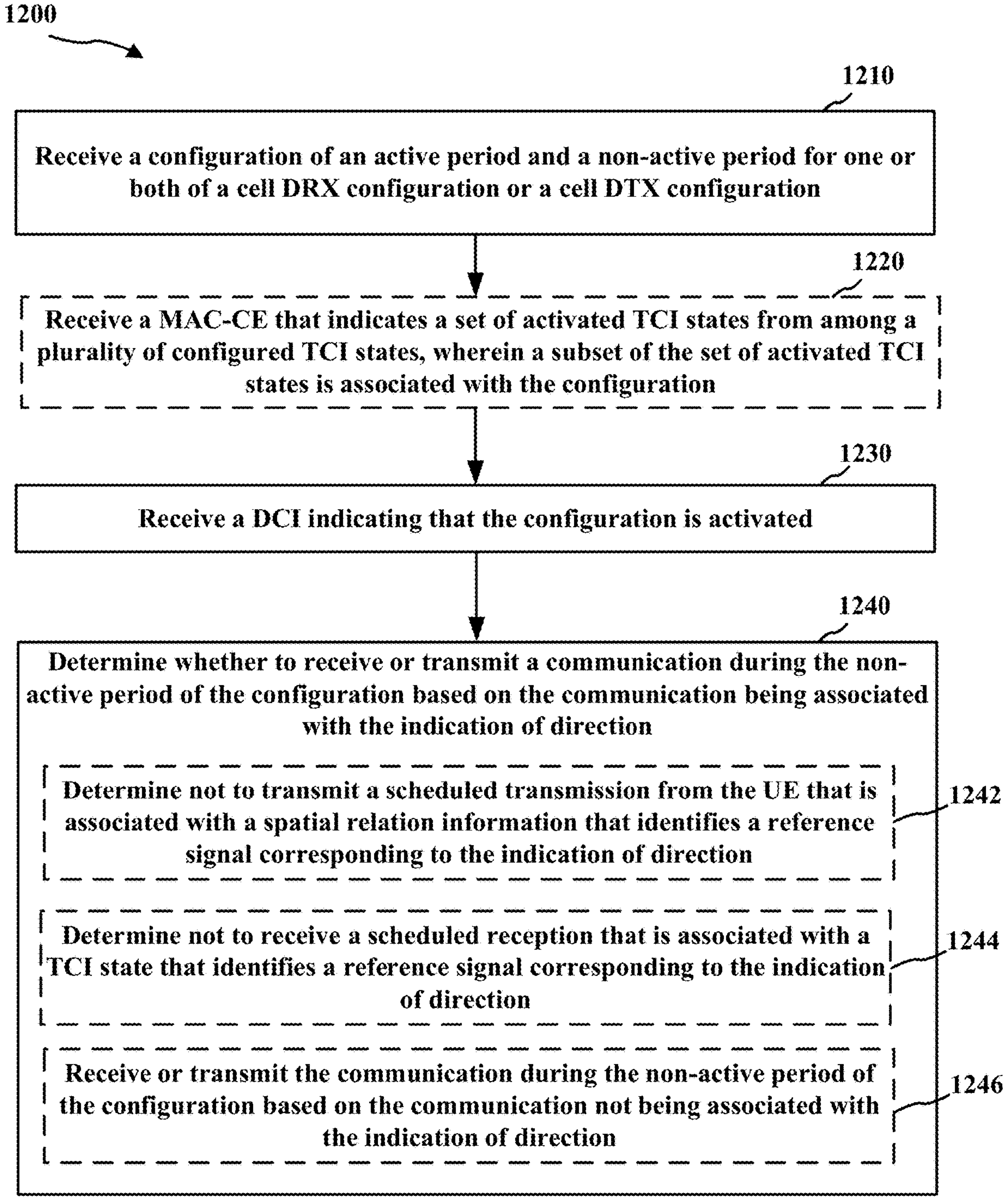
FIG. 12 is a flowchart of an example method for a UE to follow a cell DTX/DRX configuration associated with a direction.

FIG. 12 is a flowchart of an example method 1200 for a UE 104 to follow a cell DTX/DRX configuration associated with a direction. The method 1200 may be performed by a UE (such as the UE 104, which may include the memory 360 and which may be the entire UE 104 or a component of the UE 104 such as the directional cell DTX/DRX support component 140, TX processor 368, the RX processor 356, or the controller/processor 359). The method 1200 may be performed by the directional cell DTX/DRX support component 140 in communication with the directional cell DTX/DRX component 120 of one or more TRPs (e.g., base station 102). Optional blocks are shown with dashed lines.

At block 1210, the method 1200 includes receiving a configuration of an active period and a non-active period for one or both of a cell DRX configuration or a cell DTX configuration. In some implementations, for example, the UE 104, the RX processor 356, or the controller/processor 359 may execute the directional cell DTX/DRX support component 140 or the configuration Rx component 142 to receive the configuration 710 of an active period 612 and a non-active period 614 for one or both of a cell DRX configuration or a cell DTX configuration. In some implementations, the configuration 710 indicates an indication of direction associated with the configuration. Accordingly, the UE 104, the RX processor 356, or the controller/processor 359 executing the directional cell DTX/DRX support component 140 or the configuration Rx component 142 may provide means for receiving a configuration of an active period and a non-active period for one or both of a cell DRX configuration or a cell DTX configuration.

At block 1220, the method 1200 may optionally include receiving a MAC-CE that indicates a set of activated TCI states from among a plurality of configured TCI states, wherein a subset of the set of activated TCI states is associated with the configuration. In some implementations, for example, the UE 104, the RX processor 356 or the controller/processor 359 may execute the directional cell DTX/DRX support component 140 or the association component 146 to receive the MAC-CE 720 that indicates a set of activated TCI states from among a plurality of configured TCI states. A subset of the set of activated TCI states is associated with the configuration. In some implementations, the MAC-CE 720 includes an indication (e.g., additional octet 820*e*) of whether each TCI state of the set of activated TCI states is associated with the configuration. In some implementations, a configured number of TCI states indicated as activated and having lowest identifiers in the MAC-CE are associated with the configuration. Accordingly, the UE 104, the RX processor 356, or the controller/processor 359 executing the directional cell DTX/DRX support component 140 or the association component 146 may provide means for receiving a MAC-CE that indicates a set of activated TCI states from among a plurality of configured TCI states.

At block 1230, the method 1200 includes receiving a DCI indicating that the configuration is activated. In some implementations, for example, the UE 104, the RX processor 356, or the controller/processor 359 may execute the directional cell DTX/DRX support component 140 or the activation Rx component 144 to receive the DCI 730 indicating that the configuration 710 is activated. The configuration 710 is associated with an indication of direction. For instance, the indication of direction may be indicated by the configuration 710 or the DCI 730. For example, the indication of direction may be one of: a set of one or more TCI states; an index of a reference signal or a synchronization signal block (SSB); or a spatial relation information. In some implementations, the DCI 730 indicates the indication of direction associated with the configuration. Accordingly, the UE 104, the RX processor 356, or the controller/processor 359 executing the directional cell DTX/DRX support component 140 or the activation Rx component 144 may provide means for receiving a DCI indicating that the configuration is activated.

At block 1240, the method 1200 includes determining whether to receive or transmit a communication during the non-active period of the configuration based on the communication being associated with the indication of direction. In some implementations, for example, the UE 104, the RX processor 356, the TX processor 368, or the controller/processor 359 may execute the directional cell DTX/DRX support component 140 or the communication component 148 to determine whether to receive or transmit a communication 760, 770 during the non-active period 614 of the configuration 710 based on the communication being associated with the indication of direction. For example, in some implementations, at sub-block 1242, the block 1240 may optionally include determining not to transmit a scheduled transmission from the UE that is associated with a spatial relation information that identifies a reference signal corresponding to the indication of direction. As another example, at sub-block 1244, the block 1240 may optionally include determining not to receive a scheduled reception that is associated with a TCI state that identifies a reference signal corresponding to the indication of direction. In some implementations, at sub-block 1246, the block 1240 may optionally include receiving or transmitting the communication during the non-active period of the configuration based on the communication not being associated with the indication of direction. In view of the foregoing, the UE 104, the RX processor 356, the TX processor 368 or the controller/processor 359 executing the directional cell DTX/DRX support component 140 or the communication component 148 may provide means for determining whether to receive or transmit a communication during the non-active period of the configuration based on the communication being associated with the indication of direction.

Figure 13:
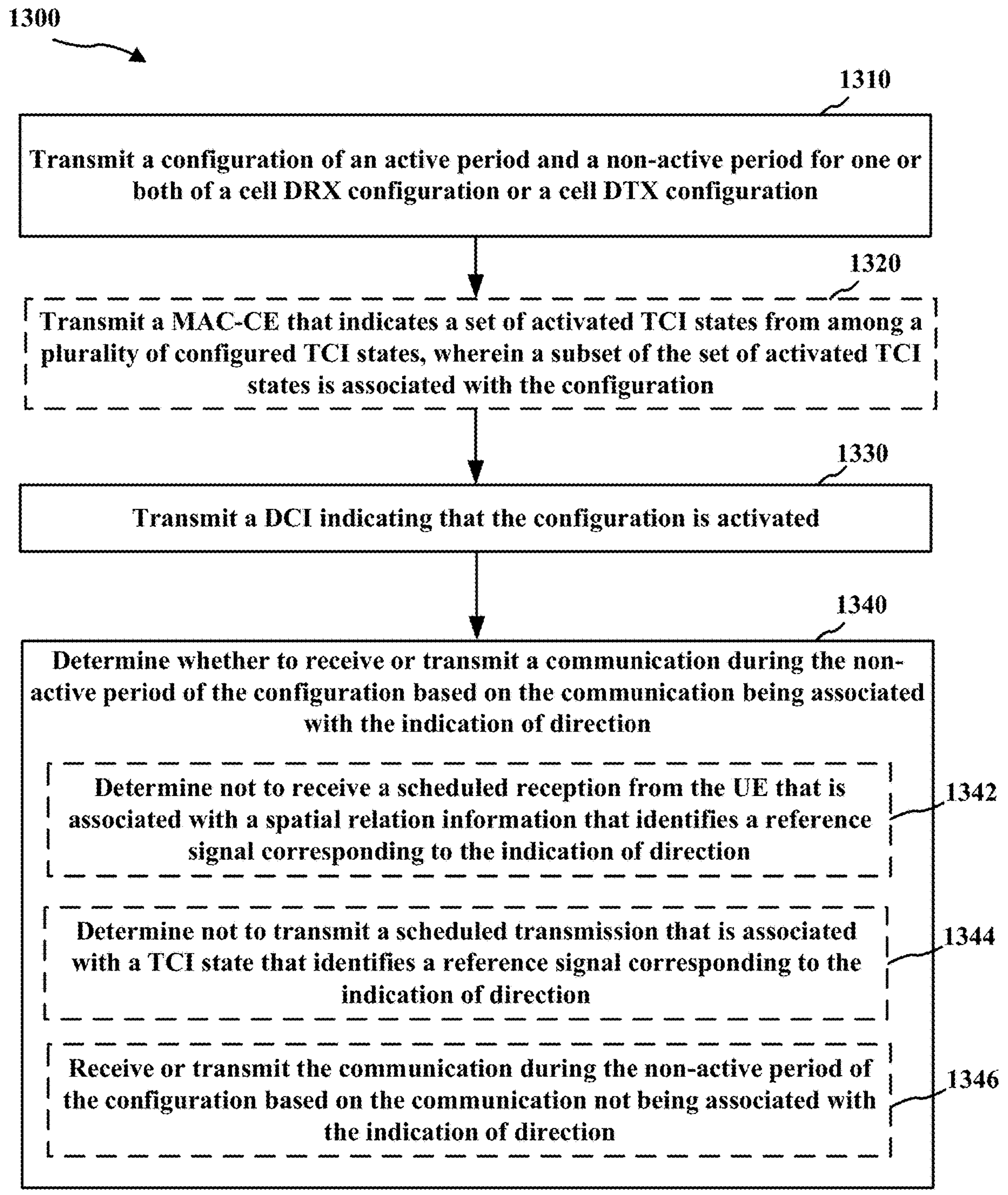
FIG. 13 is a flowchart of an example method for a network node to perform directional discontinuous reception and/or transmission.

FIG. 13 is a flowchart of an example method 1300 for a network node (e.g., a base station, gNB, or TRP) to perform directional discontinuous reception and/or transmission. The method 1300 may be performed by a network node (such as the base station 102, which may include the memory 376 and which may be the entire base station 102 or a component of the base station 102 such as the directional cell DTX/DRX component 120, the TX processor 316, the RX processor 370, or the controller/processor 375). The method 1300 may be performed by the directional cell DTX//DRX component 120 in communication with the directional cell DTX/DRX support component 140 of the UE 104.

At block 1310, the method 1300 includes transmitting a configuration of an active period and a non-active period for one or both of a cell DRX configuration or a cell DTX configuration. In some implementations, for example, the base station 102, the TX processor 316, or the controller/processor 375 may execute the directional cell DTX/DRX component 120 or the configuration Tx component 122 to transmit the configuration 710 of an active period 612 and a non-active period 614 for one or both of a cell DRX configuration or a cell DTX configuration. In some implementations, the configuration 710 indicates an indication of direction associated with the configuration. Accordingly, the base station 102, the TX processor 316, or the controller/processor 375 executing the directional cell DTX/DRX component 120 or the configuration Tx component 122 may provide means for transmitting a configuration of an active period and a non-active period for one or both of a cell DRX configuration or a cell DTX configuration.

At block 1320, the method 1300 may optionally include transmitting a MAC-CE that indicates a set of activated TCI states from among a plurality of configured TCI states, wherein a subset of the set of activated TCI states is associated with the configuration. In some implementations, for example, the base station 102, the TX processor 316, or the controller/processor 375 may execute the directional cell DTX/DRX component 120 or the association component 126 to transit the MAC-CE 720 that indicates a set of activated TCI states from among a plurality of configured TCI states. A subset of the set of activated TCI states is associated with the configuration. In some implementations, the MAC-CE 720 includes an indication (e.g., additional octet 820*e*) of whether each TCI state of the set of activated TCI states is associated with the configuration. In some implementations, a configured number of TCI states indicated as activated and having lowest identifiers in the MAC-CE are associated with the configuration. Accordingly, the base station 102, the TX processor 316, or the controller/processor 375 executing the directional cell DTX/DRX component 120 or the association component 126 may provide means for transmitting a MAC-CE that indicates a set of activated TCI states from among a plurality of configured TCI states.

At block 1330, the method 1300 includes transmitting a DCI indicating that the configuration is activated. In some implementations, for example, the base station 102, the TX processor 316, or the controller/processor 375 may execute the directional cell DTX/DRX component 120 or the activation Tx component 124 to transmit the DCI 730 indicating that the configuration 710 is activated. The configuration 710 is associated with an indication of direction. For instance, the indication of direction may be indicated by the configuration 710 or the DCI 730. For example, the indication of direction may be one of: a set of one or more TCI states; an index of a reference signal or a SSB; or a spatial relation information. In some implementations, the DCI 730 indicates the indication of direction associated with the configuration. Accordingly, the base station 102, the TX processor 316, or the controller/processor 375 executing the directional cell DTX/DRX component 120 or the activation Tx component 124 may provide means for transmitting a DCI indicating that the configuration is activated.

At block 1340, the method 1300 includes determining whether to receive or transmit a communication during the non-active period of the configuration based on the communication being associated with the indication of direction. In some implementations, for example, the base station 102, the RX processor 370, the TX processor 316 or the controller/processor 375 may execute the directional cell DTX/DRX component 120 or the communication component 128 to determine whether to receive or transmit a communication 760, 770 during the non-active period 614 of the configuration 710 based on the communication being associated with the indication of direction. For example, in some implementations, at sub-block 1342, the block 1340 may optionally include determining not to receive a scheduled reception from the UE that is associated with a spatial relation information that identifies a reference signal corresponding to the indication of direction. As another example, at sub-block 1344, the block 1340 may optionally include determining not to transmit a scheduled transmission that is associated with a TCI state that identifies a reference signal corresponding to the indication of direction. In some implementations, at sub-block 1346, the block 1240 may optionally include receiving or transmitting the communication during the non-active period of the configuration based on the communication not being associated with the indication of direction. In view of the foregoing, the base station 102, the TX processor 316, the RX processor 370 or the controller/processor 375 executing the directional cell DTX/DRX component 120 or the communication component 128 may provide means for determining whether to receive or transmit a communication during the non-active period of the configuration based on the communication being associated with the indication of direction.

The following numbered clauses provide an overview of aspects of the present disclosure:

Clause 1. A method of wireless communication for a user equipment (UE), comprising: receiving a configuration of an active period and a non-active period for one or both of a cell discontinuous reception (DRX) configuration or a cell discontinuous transmission (DTX) configuration; receiving a downlink control information indicating that the configuration is activated, wherein the configuration is associated with an indication of direction; and determining whether to receive or transmit a communication during the non-active period of the configuration based on the communication being associated with the indication of direction.

Clause 2. The method of clause 1, wherein the indication of direction is one of: a set of one or more transmission configuration indication (TCI) states; an index of a reference signal or a synchronization signal block (SSB); or a spatial relation information.

Clause 3. The method of clause 1 or 2, wherein determining whether to receive or transmit the communication during the non-active period comprises determining not to transmit a scheduled transmission from the UE that is associated with a spatial relation information that identifies a reference signal corresponding to the indication of direction.

Clause 4. The method of any of clauses 1-3, wherein determining whether to receive or transmit the communication during the non-active period comprises determining not to receive a scheduled reception that is associated with a TCI state that identifies a reference signal corresponding to the indication of direction.

Clause 5. The method of clause 1 or 2, wherein determining whether to receive or transmit the communication during the non-active period comprises receiving or transmitting the communication during the non-active period of the configuration based on the communication not being associated with the indication of direction.

Clause 6. The method of any of clauses 1-4, wherein the configuration indicates the indication of direction associated with the configuration.

Clause 7. The method of any of clauses 1-4, wherein the downlink control information indicates the indication of direction associated with the configuration.

Clause 8. The method of any of clauses 1-4 further comprising receiving a media access control-control element (MAC-CE) that indicates a set of activated TCI states from among a plurality of configured TCI states, wherein a subset of the set of activated TCI states is associated with the configuration.

Clause 9. The method of clause 8, wherein the MAC-CE includes an indication of whether each TCI state of the set of activated TCI states is associated with the configuration.

Clause 10. The method of clause 8, wherein a configured number of TCI states indicated as activated and having lowest identifiers in the MAC-CE are associated with the configuration.

Clause 11. A method of wireless communication for a network node, comprising: transmitting, to a user equipment (UE), a configuration of an active period and a non-active period for one or both of a cell discontinuous reception (DRX) configuration or a cell discontinuous transmission (DTX) configuration; transmitting, to the UE, a downlink control information indicating that the configuration is activated, wherein the configuration is associated with an indication of direction; and determining whether to receive or transmit a communication with the UE during the non-active period of the configuration based on the communication being associated with the indication of direction.

Clause 12. The method of clause 11, wherein the indication of direction is one of: a set of one or more transmission configuration indication (TCI) states; an index of a reference signal or a synchronization signal block (SSB); or a spatial relation information.

Clause 13. The method of clause 11 or 12, wherein determining whether to receive or transmit the communication during the non-active period comprises determining not to receive a scheduled reception from the UE that is associated with a spatial relation information that identifies a reference signal corresponding to the indication of direction.

Clause 14. The method of any of clauses 11-13, wherein determining whether to receive or transmit the communication during the non-active period comprises determining not to transmit a scheduled transmission that is associated with a TCI state that identifies a reference signal corresponding to the indication of direction.

Clause 15. The method of clause 11 or 12, wherein determining whether to receive or transmit the communication during the non-active period comprises receiving or transmitting the communication during the non-active period of the configuration based on the communication not being associated with the indication of direction.

Clause 16. The method of any of clauses 11-15, wherein the configuration indicates the indication of direction associated with the configuration.

Clause 17. The method of any of clauses 11-15, wherein the downlink control information indicates the indication of direction associated with the configuration.

Clause 18. The method of any of clauses 11-16 further comprising transmitting a media access control-control element (MAC-CE) that indicates a set of activated TCI states from among a plurality of configured TCI states, wherein a subset of the set of activated TCI states is associated with the configuration.

Clause 19. The method of clause 18, wherein the MAC-CE includes an indication of whether each TCI state of the set of activated TCI states is associated with the configuration.

Clause 20. The method of clause 18, wherein a configured number of TCI states indicated as activated and having lowest identifiers in the MAC-CE are associated with the configuration.

Clause 21. An apparatus for wireless communications at a user equipment (UE), comprising: one or more memories, individually or in combination, storing computer-executable instructions; and one or more processors, individually or in combination, configured to execute the instructions to: receive a configuration of an active period and a non-active period for one or both of a cell discontinuous reception (DRX) configuration or a cell discontinuous transmission (DTX) configuration; receive a downlink control information indicating that the configuration is activated, wherein the configuration is associated with an indication of direction; and determine whether to receive or transmit a communication during the non-active period of the configuration based on the communication being associated with the indication of direction.

Clause 22. The apparatus of clause 21, wherein the indication of direction is one of: a set of one or more transmission configuration indication (TCI) states; an index of a reference signal or a synchronization signal block (SSB); or a spatial relation information.

Clause 23. The apparatus of clause 21 or 22, wherein the one or more processors, individually or in combination, are configured not to transmit a scheduled transmission from the UE that is associated with a spatial relation information that identifies a reference signal corresponding to the indication of direction.

Clause 24. The apparatus of any of clauses 21-23, wherein the one or more processors, individually or in combination, are configured not to receive a scheduled reception that is associated with a TCI state that identifies a reference signal corresponding to the indication of direction.

Clause 25. The apparatus of clause 21 or 22, wherein the one or more processors, individually or in combination, are configured to receive or transmit the communication during the non-active period of the configuration based on the communication not being associated with the indication of direction.

Clause 26. The apparatus of any of clauses 21-25, wherein the configuration indicates the indication of direction associated with the configuration.

Clause 27. The apparatus of any of clauses 21-25, wherein the downlink control information indicates the indication of direction associated with the configuration.

Clause 28. The apparatus of any of clauses 21-25, wherein the one or more processors, individually or in combination, are configured to receive a media access control-control element (MAC-CE) that indicates a set of activated TCI states from among a plurality of configured TCI states, wherein a subset of the set of activated TCI states is associated with the configuration.

Clause 29. The apparatus of clause 28, wherein the MAC-CE includes an indication of whether each TCI state of the set of activated TCI states is associated with the configuration.

Clause 30. An apparatus for a network node, comprising: one or more memories, individually or in combination, storing computer-executable instructions; and one or more processors, individually or in combination, configured to execute the instructions to: transmit, to a user equipment (UE), a configuration of an active period and a non-active period for one or both of a cell discontinuous reception (DRX) configuration or a cell discontinuous transmission (DTX) configuration; transmit, to the UE, a downlink control information indicating that the configuration is activated, wherein the configuration is associated with an indication of direction; and determine whether to receive or transmit a communication with the UE during the non-active period of the configuration based on the communication being associated with the indication of direction.

Clause 31. The apparatus of clause 30, wherein the one or more processors, individually or in combination, are configured to cause the apparatus to perform the method of any of clauses 12-20.

Clause 32: An apparatus comprising means for performing the method of any of clauses 1-10.

Clause 54: An apparatus comprising means for performing the method of any of clauses 11-20.

Clause 53: A non-transitory computer-readable medium storing computer-executable instructions, that when executed by one or more processors of a user equipment (UE), cause the UE to perform the method of any of clauses 1-10.

Clause 54: A non-transitory computer-readable medium storing computer-executable instructions, that when executed by one or more processors of a transmit-receive-point (TRP), cause the TRP to perform the method of any of clauses 11-20.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method of wireless communication for a user equipment (UE), comprising:

receiving a configuration of an active period and a non-active period for one or both of a cell discontinuous reception (DRX) configuration or a cell discontinuous transmission (DTX) configuration;

receiving a downlink control information indicating that the configuration is activated, wherein the configuration is associated with an indication of direction; and determining whether to receive or transmit a communication during the non-active period of the configuration based on the communication being associated with the indication of direction.

2. The method of claim 1, wherein the indication of direction is one of:

a set of one or more transmission configuration indication (TCI) states;

an index of a reference signal or a synchronization signal block (SSB); or a spatial relation information.

3. The method of claim 1, wherein determining whether to receive or transmit the communication during the non-active period comprises determining not to transmit a scheduled transmission from the UE that is associated with a spatial relation information that identifies a reference signal corresponding to the indication of direction.

4. The method of claim 1, wherein determining whether to receive or transmit the communication during the non-active period comprises determining not to receive a scheduled reception that is associated with a TCI state that identifies a reference signal corresponding to the indication of direction.

5. The method of claim 1, wherein determining whether to receive or transmit the communication during the non-active period comprises receiving or transmitting the communication during the non-active period of the configuration based on the communication not being associated with the indication of direction.

6. The method of claim 1, wherein the configuration indicates the indication of direction associated with the configuration.

7. The method of claim 1, wherein the downlink control information indicates the indication of direction associated with the configuration.

8. The method of claim 1 further comprising receiving a media access control-control element (MAC-CE) that indicates a set of activated TCI states from among a plurality of configured TCI states, wherein a subset of the set of activated TCI states is associated with the configuration.

9. The method of claim 8, wherein the MAC-CE includes an indication of whether each TCI state of the set of activated TCI states is associated with the configuration.

10. The method of claim 8, wherein a configured number of TCI states indicated as activated and having lowest identifiers in the MAC-CE are associated with the configuration.

11. A method of wireless communication for a network node, comprising:

transmitting, to a user equipment (UE), a configuration of an active period and a non-active period for one or both of a cell discontinuous reception (DRX) configuration or a cell discontinuous transmission (DTX) configuration;

transmitting, to the UE, a downlink control information indicating that the configuration is activated, wherein the configuration is associated with an indication of direction; and determining whether to receive or transmit a communication with the UE during the non-active period of the configuration based on the communication being associated with the indication of direction.

12. The method of claim 11, wherein the indication of direction is one of:

a set of one or more transmission configuration indication (TCI) states;

an index of a reference signal or a synchronization signal block (SSB); or a spatial relation information.

13. The method of claim 11, wherein determining whether to receive or transmit the communication during the non-active period comprises determining not to receive a scheduled reception from the UE that is associated with a spatial relation information that identifies a reference signal corresponding to the indication of direction.

14. The method of claim 11, wherein determining whether to receive or transmit the communication during the non-active period comprises determining not to transmit a scheduled transmission that is associated with a TCI state that identifies a reference signal corresponding to the indication of direction.

15. The method of claim 11, wherein determining whether to receive or transmit the communication during the non-active period comprises receiving or transmitting the communication during the non-active period of the configuration based on the communication not being associated with the indication of direction.

16. The method of claim 11, wherein the configuration indicates the indication of direction associated with the configuration.

17. The method of claim 11, wherein the downlink control information indicates the indication of direction associated with the configuration.

18. The method of claim 11 further comprising transmitting a media access control—control element (MAC-CE) that indicates a set of activated TCI states from among a plurality of configured TCI states, wherein a subset of the set of activated TCI states is associated with the configuration.

19. The method of claim 18, wherein the MAC-CE includes an indication of whether each TCI state of the set of activated TCI states is associated with the configuration.

20. The method of claim 18, wherein a configured number of TCI states indicated as activated and having lowest identifiers in the MAC-CE are associated with the configuration.

21. An apparatus for wireless communications at a user equipment (UE), comprising:

one or more memories, individually or in combination, storing computer-executable instructions; and one or more processors, individually or in combination, configured to execute the instructions to:

receive a configuration of an active period and a non-active period for one or both of a cell discontinuous reception (DRX) configuration or a cell discontinuous transmission (DTX) configuration;

receive a downlink control information indicating that the configuration is activated, wherein the configuration is associated with an indication of direction; and determine whether to receive or transmit a communication during the non-active period of the configuration based on the communication being associated with the indication of direction.

22. The apparatus of claim 21, wherein the indication of direction is one of:

a set of one or more transmission configuration indication (TCI) states;

an index of a reference signal or a synchronization signal block (SSB); or a spatial relation information.

23. The apparatus of claim 21, wherein the one or more processors, individually or in combination, are configured not to transmit a scheduled transmission from the UE that is associated with a spatial relation information that identifies a reference signal corresponding to the indication of direction.

24. The apparatus of claim 21, wherein the one or more processors, individually or in combination, are configured not to receive a scheduled reception that is associated with a TCI state that identifies a reference signal corresponding to the indication of direction.

25. The apparatus of claim 21, wherein the one or more processors, individually or in combination, are configured to receive or transmit the communication during the non-active period of the configuration based on the communication not being associated with the indication of direction.

26. The apparatus of claim 21, wherein the configuration indicates the indication of direction associated with the configuration.

27. The apparatus of claim 21, wherein the downlink control information indicates the indication of direction associated with the configuration.

28. The apparatus of claim 21 wherein the one or more processors, individually or in combination, are configured to receive a media access control-control element (MAC-CE) that indicates a set of activated TCI states from among a plurality of configured TCI states, wherein a subset of the set of activated TCI states is associated with the configuration.

29. The apparatus of claim 28, wherein the MAC-CE includes an indication of whether each TCI state of the set of activated TCI states is associated with the configuration.

30. An apparatus for a network node, comprising:

one or more memories, individually or in combination, storing computer-executable instructions; and one or more processors, individually or in combination, configured to execute the instructions to:

transmit, to a user equipment (UE), a configuration of an active period and a non-active period for one or both of a cell discontinuous reception (DRX) configuration or a cell discontinuous transmission (DTX) configuration;

transmit, to the UE, a downlink control information indicating that the configuration is activated, wherein the configuration is associated with an indication of direction; and determine whether to receive or transmit a communication with the UE during the non-active period of the configuration based on the communication being associated with the indication of direction.

* * * * *